(12) United States Patent
Bogolea et al.

(10) Patent No.: US 10,467,587 B2
(45) Date of Patent: Nov. 5, 2019

(54) METHOD FOR TRACKING PLACEMENT OF PRODUCTS ON SHELVES IN A STORE

(71) Applicant: Simbe Robotics, Inc., San Francisco, CA (US)

(72) Inventors: Bradley Bogolea, San Francisco, CA (US); Mirza Akbar Shah, San Francisco, CA (US); Lorin Vandegrift, San Francisco, CA (US); Luke Fraser, San Francisco, CA (US); Jariullah Safi, San Francisco, CA (US); Jeffrey Gee, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 342 days.

(21) Appl. No.: 15/600,527

(22) Filed: May 19, 2017

(65) Prior Publication Data

US 2017/0337508 A1 Nov. 23, 2017

Related U.S. Application Data

(60) Provisional application No. 62/339,039, filed on May 19, 2016.

(51) Int. Cl.
*G06Q 10/08* (2012.01)
*G05D 1/02* (2006.01)
(Continued)

(52) U.S. Cl.
CPC ......... *G06Q 10/087* (2013.01); *G05D 1/0274* (2013.01); *G05D 1/0282* (2013.01);
(Continued)

(58) Field of Classification Search
CPC .............. G05D 1/0246; G05D 1/0274; G05D 2201/0207; G05D 1/0282; G06K 9/033;
(Continued)

(56) References Cited

U.S. PATENT DOCUMENTS 5,226,782 A * 7/1993 Rigling ................ B65G 1/0407
198/347.3
5,583,950 A * 12/1996 Prokoski ............... G06F 17/153
382/212
(Continued)

*Primary Examiner* — Andrew Joseph Rudy
(74) *Attorney, Agent, or Firm* — Run8 Patent Group, LLC; Peter Miller

(57) ABSTRACT

One variation of a method for tracking placement of products in a store includes: accessing an image recorded by a mobile robotic system within a store; detecting a shelf in a region of the image; based on an address of the shelf, retrieving a list of products assigned to the shelf by a planogram of the store; retrieving a set of template images— from a database of template images—defining visual features of products specified in the list of products; extracting a set of features from the region of the image; determining that a unit of the product is mis-stocked on the shelf in response to deviation between the set of features and features in a template image, in the set of template images, representing the product; and in response to determining that the unit of the product is mis-stocked on the shelf, generating a restocking prompt for the product.

20 Claims, 4 Drawing Sheets

(51) Int. Cl.
   *G06K 9/03*     (2006.01)
   *G06K 9/62*     (2006.01)
   *H04N 5/232*    (2006.01)
   *G06K 9/00*     (2006.01)
   *H04N 1/00*     (2006.01)
   *H04N 5/357*    (2011.01)

(52) U.S. Cl.
   CPC ......... *G06K 9/00771* (2013.01); *G06K 9/033* (2013.01); *G06K 9/6201* (2013.01); *G06K 9/6217* (2013.01); *H04N 1/00* (2013.01); *H04N 5/232* (2013.01); *H04N 5/23229* (2013.01); *H04N 5/23238* (2013.01); *H04N 5/3572* (2013.01); *G05D 1/0246* (2013.01); *G05D 2201/0207* (2013.01)

(58) Field of Classification Search
   CPC ............... G06K 9/6201; G06K 9/6217; G06K 9/00771; G06Q 10/087; H04N 1/00; H04N 5/232; H04N 5/23238; H04N 5/3572; H04N 5/23229
   USPC .................................... 700/216, 217; 705/28
   See application file for complete search history.

(56) References Cited

U.S. PATENT DOCUMENTS

| | | | |
|---|---|---|---|
| 7,475,205 B2* | 1/2009 | McIntosh | G11B 27/002 710/13 |
| 7,542,883 B2* | 6/2009 | Kumazawa | G06Q 90/00 703/2 |
| 7,693,757 B2* | 4/2010 | Zimmerman | G06Q 10/00 235/462.11 |
| 8,098,888 B1* | 1/2012 | Mummareddy | G06K 9/00778 382/103 |
| 8,326,451 B2* | 12/2012 | Schantz | G01S 13/751 700/215 |
| 9,273,973 B2* | 3/2016 | Sakamoto | G05D 1/0214 |
| 9,663,309 B2* | 5/2017 | Priebe | B65G 57/26 |
| 10,162,043 B2* | 12/2018 | Simon | G01S 1/042 |
| 2002/0165638 A1 | 11/2002 | Bancroft et al. | |
| 2003/0154141 A1 | 8/2003 | Capazario et al. | |
| 2004/0162765 A1* | 8/2004 | Reber | G06Q 10/087 705/26.9 |
| 2005/0261975 A1 | 11/2005 | Carver | |
| 2007/0061041 A1* | 3/2007 | Zweig | G05D 1/0261 700/245 |
| 2008/0024300 A1* | 1/2008 | Fawcett | B65D 29/04 340/572.1 |
| 2008/0077511 A1 | 3/2008 | Zimmerman | |
| 2009/0325598 A1* | 12/2009 | Guigne | G01S 5/021 455/456.1 |
| 2010/0070369 A1* | 3/2010 | Fenton | G06Q 20/3224 705/14.58 |
| 2012/0126000 A1 | 5/2012 | Kunzig et al. | |
| 2014/0247116 A1 | 9/2014 | Davidson | |
| 2014/0279294 A1 | 9/2014 | Field-Darragh et al. | |
| 2014/0361077 A1 | 12/2014 | Davidson | |
| 2015/0073586 A1 | 3/2015 | Weiss | |
| 2015/0073588 A1 | 3/2015 | Priebe et al. | |
| 2015/0088937 A1* | 3/2015 | Lons | G06Q 10/00 707/803 |
| 2015/0161715 A1* | 6/2015 | Rose | G06Q 30/0639 705/26.8 |

\* cited by examiner

METHOD FOR TRACKING PLACEMENT OF PRODUCTS ON SHELVES IN A STORE

CROSS-REFERENCE TO RELATED APPLICATIONS

This Application claims the benefit of U.S. Provisional Application No. 62/339,039, filed on 19 May 2016, which is incorporated in its entirety by this reference.

The Application is related to U.S. patent application Ser. No. 15/347,689, filed on 9 Nov. 2016, which is incorporated in its entirety by this reference.

TECHNICAL FIELD

This invention relates generally to the field of stock tracking and more specifically to a new and useful method for tracking placement of products on shelves in a store in the field of stock tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
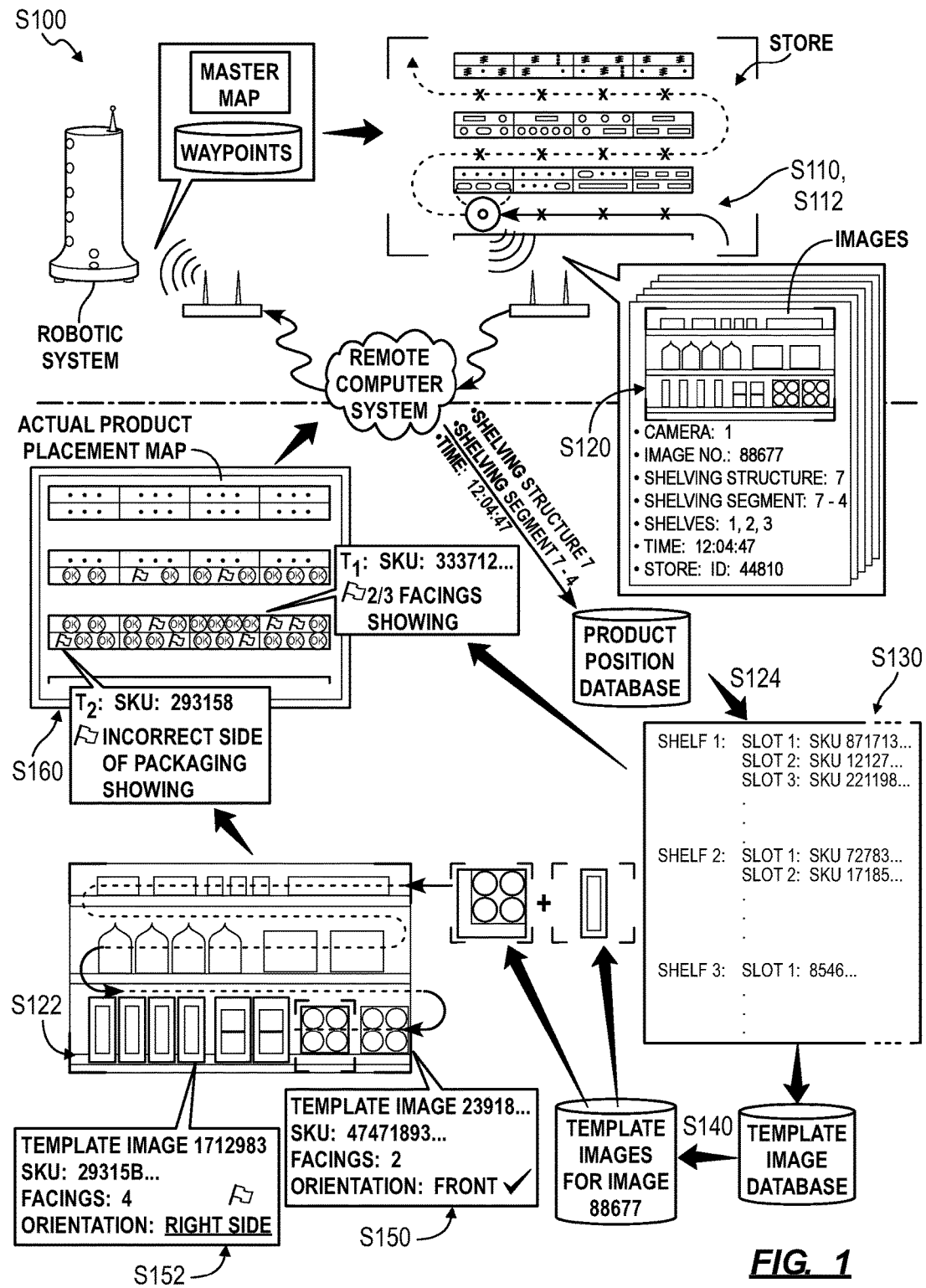
FIG. 1 is a flowchart representation of a method.

As shown in FIG. 1, a method S100 for tracking placement of products on shelves in a store includes: accessing a first image including visual data recorded by a mobile robotic system at a first time in Block S120, the first image associated with a first location and a first orientation of the mobile robotic system within the store at the first time; detecting a first shelf represented proximal a first region of the first image in Block S122; accessing an address of the first shelf in Block S130 based on the first location, the first orientation, and a vertical position of the first shelf within the first image; based on the address of the first shelf, retrieving a first list of products assigned to the first shelf by a planogram of the store in Block S130; retrieving a first set of template images from a database of template images in Block S140, each template image in the first set of template images including visual features of a product specified in the first list of products; extracting a first set of features from the first region of the first image in Block S124; confirming presence of a unit of a first product, in the first list of products, on the first shelf in Block S150 in response to correlation between features in the first set of features and features in a first template image, in the first set of template images, representing the first product; determining that the unit of the first product is improperly stocked on the first shelf in Block S152 in response to deviation between features in the first set of features and features in the first template image; and, in response to determining that the unit of the first product is improperly stocked on the first shelf, generating a first restocking prompt for the first product on the first shelf in Block S160.

Figure 4:
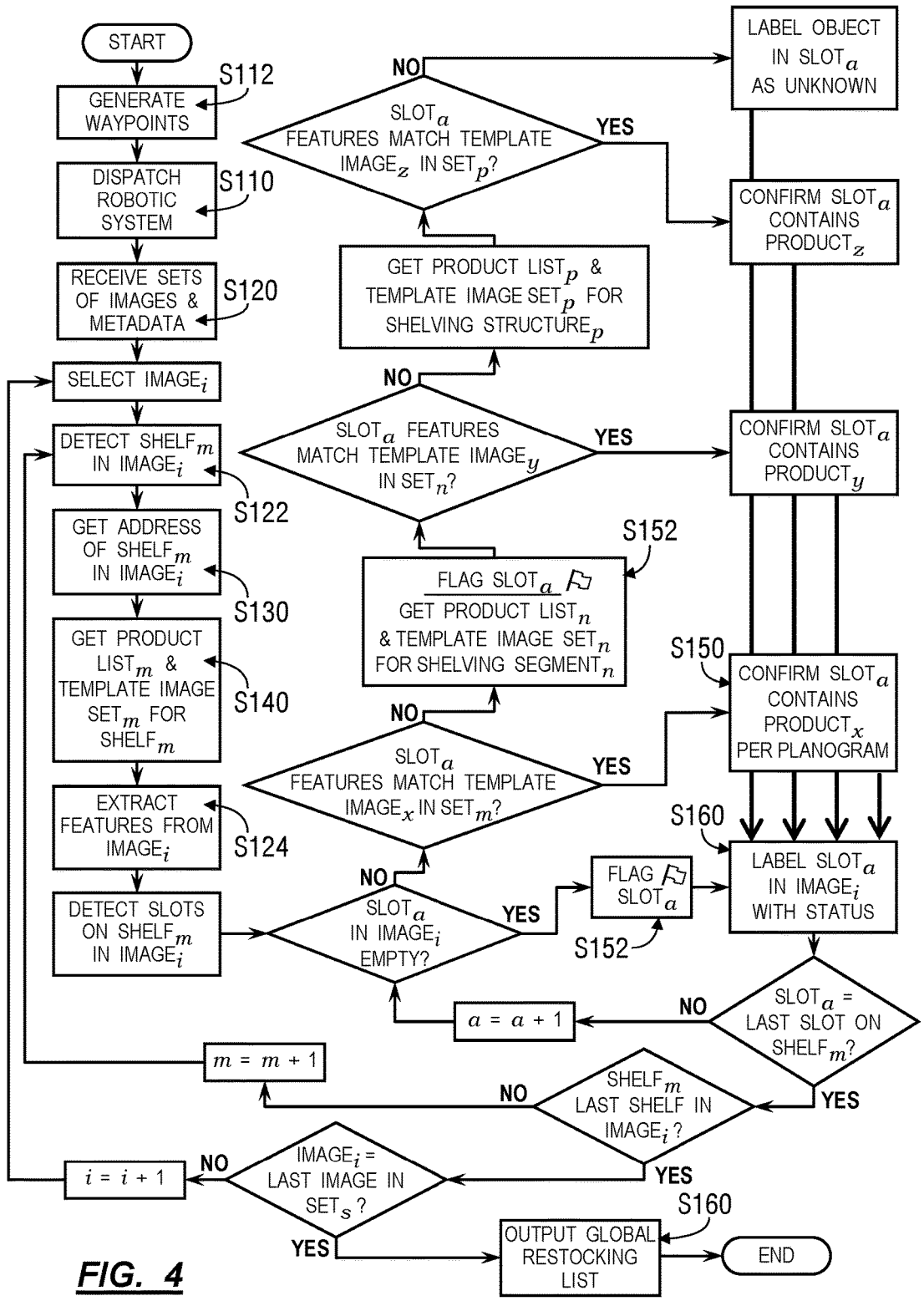
FIG. 4 is a flowchart representation of one variation of the method.

As shown in FIG. 4, one variation of the method S100 includes: at a robotic system, navigating to a position within a store proximal a location defined by a preset waypoint in Block S110; based on an image specification defined by the preset waypoint, capturing a photographic image through a first camera in a set of cameras arranged in the robotic system in Block S112; based on the preset waypoint, accessing a product identifier of a product designated for stocking on a shelf proximal the location in Block S130; selecting a set of template images, from a database of template images, corresponding to the product identifier in Block S140; confirming presence of a unit of the product on the shelf based on a similarity between a particular template image, in the set of template images, and a region of the photographic image in Block S150; identifying misalignment of the unit of the product on the shelf based on a product orientation associated with the particular template image in Block S152; and issuing a prompt to manually correct the position of the unit of the product on the shelf in Block S160.

Figure 5:
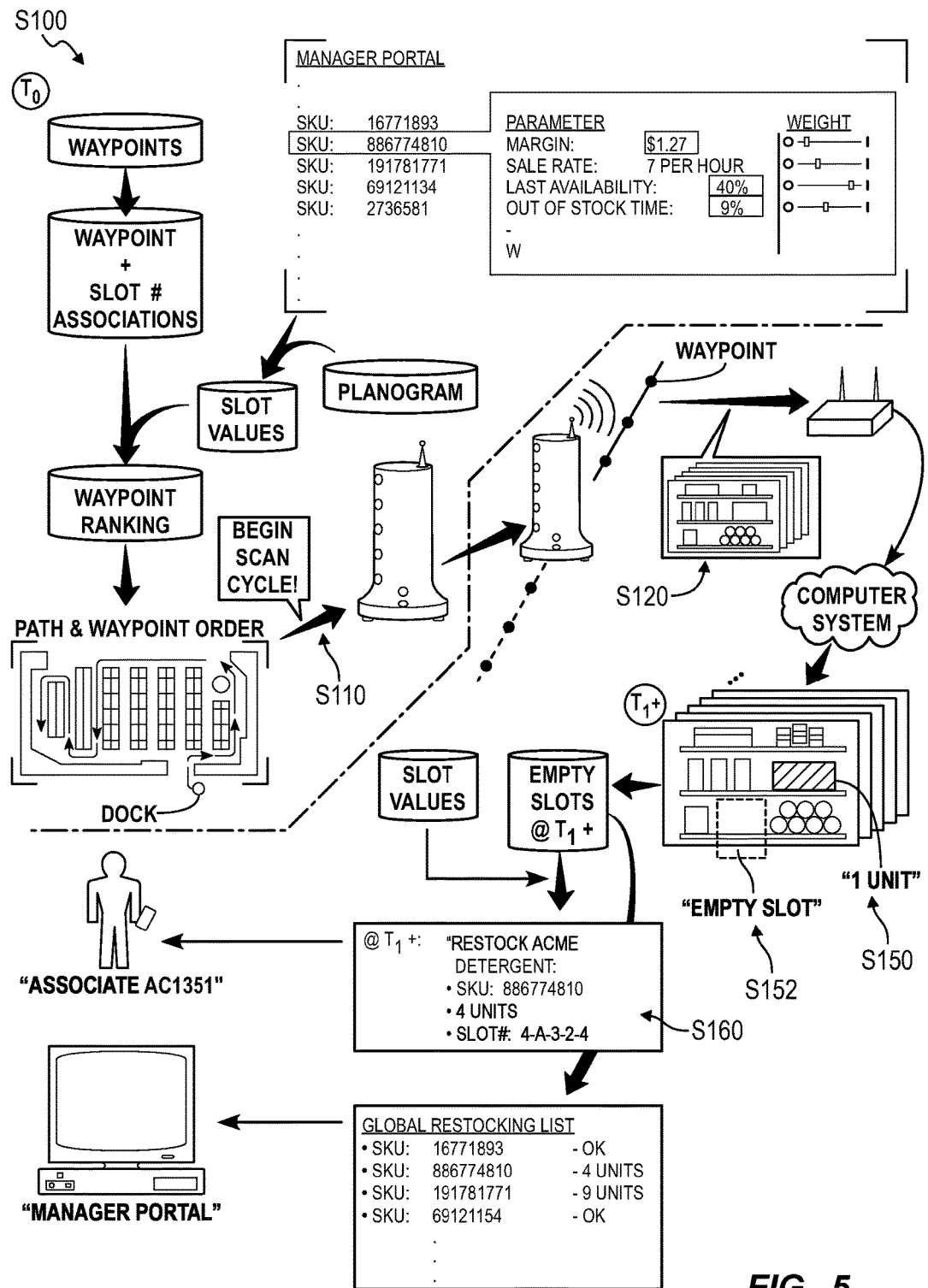
FIG. 5 is a flowchart representation of one variation of the method.

As shown in FIG. 5, another variation of the method S100 includes: at a robotic system, navigating to a position within a store proximal a location defined by a preset waypoint in Block S110; based on an image specification defined by the preset waypoint, capturing a photographic image through a first camera in a set of cameras arranged in the robotic system in Block S112; based on the preset waypoint, accessing a set of product identifiers of products designated for shelves proximal the location in Block S130; selecting a set of template images from a database of template images in Block S140, each template image in the set of template images corresponding to a product identifier in the set of product identifiers; correlating a set of regions of the photographic image with product identifiers in the set of product identifiers based on similarities between regions in the set of regions and template images in the set of template images in Block S124; identifying a deviation from a specified placement of products on shelves in the store based on a difference between a planogram corresponding to shelves proximal the location and arrangement of the set of regions in the photographic image in Block S152; and issuing a prompt to manually correct positions of products on the shelves in the store based on the deviation identified in Block S160.

2. Applications

Generally, Blocks of the method S100 can be executed by a computer system: to dispatch a robotic system to capture images of products arranged on shelves throughout a retail space (e.g., a grocery store); to determine stocking status of products assigned to slots on shelves throughout the retail space based on images received from the robotic system and a planogram defining product locations throughout the retail space; and to automatically prompt an associate of the retail space to reload empty slots throughout the retail space. In particular, the computer system can execute Blocks of the method S100 to automatically: collect images of shelves within a store; determine the presence and arrangement of units of products on these shelves from these images; identify deviations between actual product arrangement throughout the store and target product presentation requirements defined in a planogram of the store; and to package such deviations for consumption and handling by associates (e.g., employees) of the store. The computer system can therefore: dispatch a robotic system to collect images of shelves within a store in Block S110; receive images from the robotic system in real-time en bloc in Block S112; process these images to determine the presences, positions, and/or orientations of products on shelves in the store and to identify deviations from store planograms based on these product presences, positions, and/or orientations in Blocks S130, S132, and S134; and automatically prompt associates of the store to correct these deviations in Blocks S140 and S150.

The system can implement a set of waypoints defining locations within a store at which the robotic system is to navigate and capture one or more images during a scanning cycle, and the system can link a waypoint (or content in the waypoint) to an image captured by the robotic system while at or near the waypoint. For example, the robotic system can be placed within a retail store (or warehouse, etc.), and the remote computer system (e.g., a remote server connected to the robotic system via the Internet) can dispatch the robotic system to collect images at waypoints throughout the retail store outside of store hours, such as every night beginning at 1 AM. The robotic system can thus complete a scan cycle before the retail store opens a few hours later. Alternatively, the system can dispatch the mobile robotic system during store hours to collect data representative of the stock state of the store in real-time as patrons move, remove, and occasionally return product on, from, and to shelves throughout the store.

The system can then process images collected during the scan cycle to generate a graph, map, or table of current product placement on shelves in the store, to generate a global stock state of the store, and/or to generate a global restocking list containing a set of prompts or tasks for correcting missing, misplaced, or misoriented products throughout the tore. For example, based on the waypoint, location, and or orientation of the mobile robotic system when an image of a shelving segment was recorded, which may be stored in metadata of this image, the system can retrieve a list of stock keeping units (SKUs) or other identifiers of products designated for stocking on one or more shelves near the waypoint, such as all SKUs assigned to a shelving structure, all SKUs assigned to a shelving segment, all SKUs assigned to a single shelf, or a SKU assigned to a particular slot, etc. in the field of view of the robotic system when the image was captured. Based on these SKUs, the system can filter a relatively large database (e.g., millions) of template images down to a relatively small set of (e.g., fifteen) template images of products expected or most likely to occupying this singular shelf, shelving segment, or shelving structure according to planogram of the store. By implementing computer vision techniques to compare this relatively small set of template images to subregions in the image, the system can determine the presence, orientation, and/or position of various products on shelves in the store relatively quickly and with a relatively high degree of accuracy.

In particular, the system can: identify a region of an image corresponding to a single shelf in a single shelving segment within a single shelving structure in a store; identify this shelf based on a waypoint, location, and/or orientation occupied by the robotic arm when the image was recorded and based on the position of the region in the image; and narrow its comparison of subregions in this region of the image—containing a discrete group of features representative of discrete physical products—to a very small set of template images of products assigned to this shelf. By aggregating a list of products assigned to this shelf by a planogram current to the store and then retrieving a set of template images of these products exclusively, the system can maintain a high degree of accuracy in detecting products on this shelf while also limiting resource consumption (e.g., processing time, processing power) to process the image. However, if the system fails to identify a match between a particular subregion of the image—representing a discrete product—and any template image in this first set of template images, the system can escalate (i.e., enlarge) the set of template images to a larger set of template images of products assigned to all shelves in the shelving segment, since a product represented in the particular subregion of the image may have been moved its current location from a nearby shelf on the same shelving segment. Furthermore, if the system fails to a identify a match between the particular subregion of the image and any template image in this second set of template images, the system can escalate the set of template images to include products assigned to all shelving segments in the same shelving structure, then to both shelving structures facing the same aisle, then to the same region or area of the store, and then to the entire store, etc. until a match is detected or until a threshold amount of resources have been consumed in attempting to identify the product represented in the particular subregion of the image. The system can then repeat this process for each other slot, shelf, shelving segment, and/or shelving structure in the store in order to identify substantially all products stocked throughout the store, to track locations of these products, and to identify deviations in the presence and locations of these products from a planogram assigned to the store.

The system can then package alignment and deviations between identified products throughout the store and the current planogram of the store into a graph, map, table, stock list, task list, and/or other container, such as including prompts to correct specific slots throughout the store; and then present this container to associates of the store, such as upon their arrival at the retail store the next morning before the retail store opens or in real-time as images are received from the robotic system and processed during open store hours.

3. Robotic System

A robotic system executes Blocks S110 and S112 of the method S100 to navigate to a waypoint and to capture images of shelves in the store. Generally, the robotic system can define a network-enabled mobile robot that can autonomously traverse a store, capture images of shelves within the store, and upload those images to a remote computer system for analysis.

Figure 3:
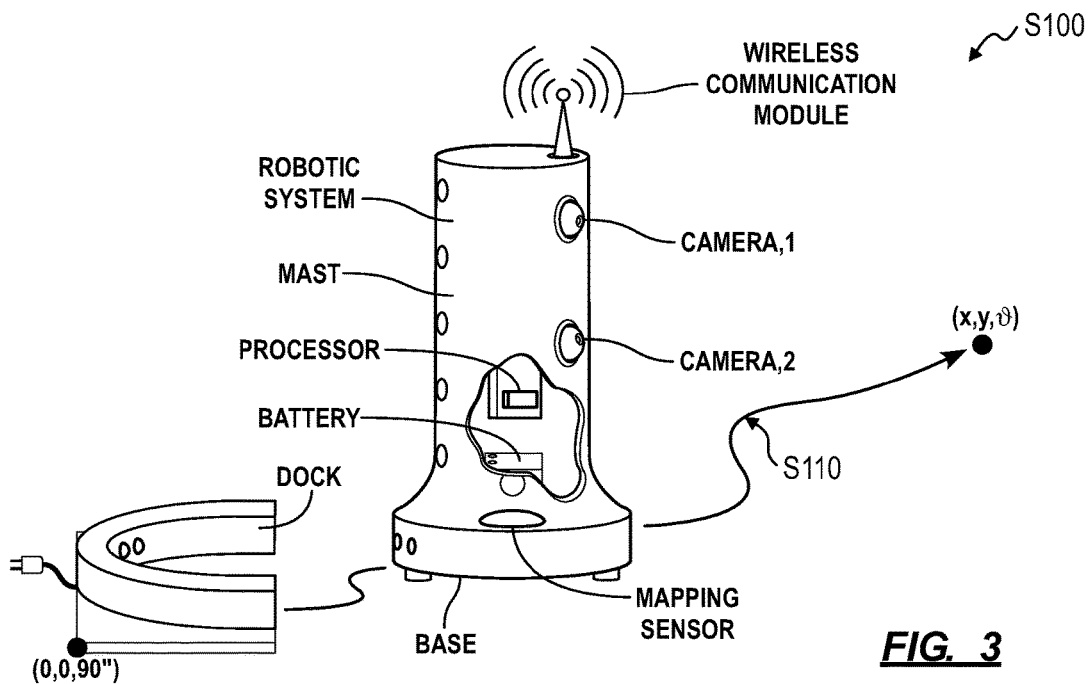
FIG. 3 is a schematic representation of one variation of the method.

In one implementation, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of cameras arranged on the mast; a geospatial position sensor (e.g., a GPS sensor); and a wireless communication module that downloads waypoints and a master map of a store from a remote computer system (e.g., a remote server) and that uploads photographic images captured by the camera and maps generated by the processor to the remote computer system, as shown in FIG. 3. In this implementation, the robotic system can include cameras mounted statically to the mast, such as two vertically offset cameras on a left side of the mast and two vertically offset cameras on the right side of mast, as shown in FIG. 3. The robotic system can additionally or alternatively include articulable cameras, such as: one camera on the left side of the mast and supported by a first vertical scanning actuator; and one camera on the right side of the mast and supported by a second vertical scanning actuator. The robotic system can also include a zoom lens, a wide-angle lens, or any other type of lens on each camera. However, the robotic system can define any other form and can include any other subsystems or elements supporting autonomous navigating and image capture throughout a store environment.

The system can also include multiple robotic systems placed in a single store and configured to cooperate to image shelves within the store. For example, two robotic systems can be placed in a large single-floor retail and can cooperate to collect images of all shelves in the store within a threshold period of time (e.g., within one hour). In another example, one robotic system can be placed on each floor of a multi-floor store, and each robotic system can each collect images of shelves on its corresponding floor. The remote computer system can then aggregate images captured by multiple robotic systems placed in one store to generate a graph, map, table, and/or task list of properly- and improperly-stocked slots within the store.

4. Hierarchy and Terms

A "product facing" is referred to herein as a side of a product (e.g., of a particular SKU or other product identifier) designated for a slot. A "planogram" is referred to herein as a graphical representation of multiple product facings across each of multiple shelving structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section of a shelf designated for occupation by one product facing, including a row of one or more units of a product. A "shelf" is reference herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles.

A "product" is referred to herein as a type of packaged good associated with a particular product identifier (e.g., a SKU). A "unit" or "product unit" is referred to herein as an instance of a product, such as one packaged article in a series of packaged articles associated with one SKU value.

The method S100 is described herein as executed by a remote computer system (e.g., a remote server, hereinafter a "computer system"). However, Blocks of the method S100 can be executed by one or more robotic systems placed in a retail space (or store, warehouse, etc.), by a local computer system, or by any other computer system—hereinafter a "system."

Furthermore, Blocks of the method S100 are described below as executed by the system to identify products stocked on open shelves on shelving structures within a store. However, the system can implement similar methods and techniques to identify products stocked in cubbies, in a refrigeration unit, on a wall rack, in a freestanding floor rack, on a table, or on or in any other product organizer in a retail space.

5. Waypoints

The computer system can implement a set of waypoints defining locations within a store at which the robotic system is to navigate and capture one or more images during a scan cycle, and the computer system can link a waypoint (or content in the waypoint) to an image captured by the robotic system while at or near the waypoint. Based on the location specified in the waypoint, the computer system can retrieve a list of stock keeping units (SKUs) or other identifiers of products designated for stocking on shelves near the waypoint, such as all SKUs designated for a shelving structure, all SKUs in a shelving segment, all SKUs on a set of shelves, or a SKU for a particular slot, etc. in the field of view of the camera when the image was captured. Based on the SKUs, the computer system can filter a relatively large database (e.g., millions) of template images down to a relatively small set of (e.g., fifteen) template images particularly relevant to the image. By implementing computer vision techniques to compare this relatively small set of template images to subregions in the image, the computer system can determine the presence, orientation, and/or position of various products on shelves in the store relatively quickly and with a relatively high degree of accuracy.

For example, the robotic system can be placed within a retail store (or warehouse, etc.), and the computer system (e.g., a remote server connected to the robotic system via the Internet) can dispatch the robotic system to collect images at waypoints throughout the retail store outside of store hours, such as every night beginning at 1 AM. The robotic system can thus complete a scan cycle before the retail store opens a few hours later. Furthermore, the computer system can process images collected during the scan cycle to generate a graph, map, or table of current product placement on shelves in the store and/or to generate a task list of misplaced or misoriented products to correct, and the computer system can present this graph, map, table, and/or task list to associates upon their arrival at the retail store the next morning before the retail store opens. Alternatively, the computer system can dispatch the robotic system to waypoints within the store during store hours and can process images received from the robotic system substantially in real-time to generate current such graphs, maps, tables, and/or task lists in near-real-time.

The computer system can therefore maintain, update, and distribute a set of waypoints to the robotic system, wherein each waypoint defines a location within a store at which the robotic system is to capture one or more images. In one implementation, the computer system defines an origin of a two-dimensional Cartesian coordinate system for the store at a charging station (or "dock," as shown in FIG. 5)—for the robotic system—placed in the store, and a waypoint for the store defines a location within the coordinate system, such as a lateral ("x") distance and a longitudinal ("y") distance from the origin. Thus when executing a waypoint, the robotic system can navigate to (e.g., within three inches of) an (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("ϑ") relative to the origin of the store, based on an angular position of an aisle or shelving structure in the coordinate system, as shown in FIG. 5. When executing a waypoint, the robotic system can orient to (e.g., within 1.5° of) the target orientation defined in the waypoint in order to align a camera to an adjacent shelving structure.

When navigating to a waypoint, the robotic system can scan an environment nearby with the mapping sensor (e.g., a LIDAR sensor, as described above), compile scans into a new map of the robotic system's environment, determine its location within the store by comparing the new map to a master map of the store defining the coordinate system of the store, and navigate to a position and orientation within the store at which the output of the mapping sensor aligns—within a threshold distance and angle—with a region of the master map corresponding to the (x,y,∂) location and target orientation defined in the waypoint. A waypoint can also include a geospatial position (e.g., a GPS location), such as in the form of a backup or redundant location. For example, when navigating to a waypoint, the robotic system can approach the geospatial position defined in the waypoint; once within a threshold distance (e.g., five feet) from the geospatial position, the computer system can navigate to a position and orientation at which the output of the mapping sensor aligns—within a threshold distance and angle—with a region of the master map corresponding to the (x,y,∂) location and target orientation defined in the waypoint.

Furthermore, a waypoint can include an address of each camera that is to capture an image once the robotic system can navigate to the waypoint. For example, for the robotic system that includes an upper-left camera, a lower-left camera, an upper-right camera, and a lower-right camera, the waypoint can include all or a subset of camera addresses [1, 2, 3, 4] corresponding to an upper-left camera, a lower-left camera, an upper-right camera, and a lower-right camera, respectively. In this example: a first waypoint designating a location centered between two facing full-height shelving segments can address all four cameras in the robotic system (e.g., camera addresses [1, 2, 3, 4]); a second waypoint designating a location centered between two facing half-height shelving segments can address the lower-left and lower-right cameras in the robotic system (e.g., camera addresses [2, 4]); and a third waypoint designating a location adjacent a single full-height shelving segment and a target orientation of 90° can address the upper-right and lower-right cameras in the robotic system (e.g., camera addresses [3, 4]). Alternatively, for the robotic system that includes articulable cameras, a waypoint can define an address and arcuate position of each camera that is to capture an image at the waypoint.

A waypoint can also specify (or be linked to) addresses of a category, an aisle, a shelving structure, a shelving segment, one or more shelves, and/or one or more slots expected to be in the field of view of a particular camera designated to capture an image at the waypoint. For example, a waypoint can designate all four cameras in the robotic system to capture images at the location specified in the waypoint, and the waypoint can designate: a [laundry section, aisle 2, shelving structure 1, shelving segment 2, shelves 1-4] address for a first image capture by the lower-left camera; a [laundry section, aisle 2, shelving structure 1, shelving segment 2, shelves 5-8] address for a second image capture by the upper-left camera; a [laundry section, aisle 2, shelving structure 2, shelving segment 2, shelves 1-4] address for a third image capture by the lower-right camera; and a [laundry section, aisle 2, shelving structure 2, shelving segment 2, shelves 5-8] address for a fourth image capture by the lower-left camera.

6. Robotic System Navigation

Block S110 of the method S100 recites, at a robotic system, navigating to a position within a store proximal a location defined by a preset waypoint. Generally, during a scan cycle in Block S110, the robotic system autonomously navigates to a position and orientation—within a threshold distance and angle of a location and target orientation—specified in a current waypoint in preparation to capture one or more images, as specified in the waypoint. Alternatively, Block S110 can recite dispatching the remote controller to a waypoint corresponding to a slot, shelf, shelving segment, and/or shelving structure within the store; and the remote computer system can execute Block S110 by communicating one or more waypoints to the robotic system, such as over a computer network.

In one implementation, before initiating a new scan cycle, the robotic system can download—from the remote computer system—a set of waypoints, a preferred order for the waypoints, and a master map of the store defining the coordinate system of the store. Once the robotic system leaves its assigned charging station at the beginning of a scan cycle, the robotic system can repeatedly sample its integrated mapping sensors (e.g., a LIDAR sensor) and construct a new map of its environment based on data collected by the mapping sensors. By comparing the new map to the master map, the robotic system can track its location within the store throughout the scan cycle. Furthermore, to navigate to a next waypoint, the robotic system can confirm its achievement of the waypoint—within a threshold distance and angular offset—based on alignment between a region of the master map corresponding to the (x,y,∂) location and target orientation defined in the current waypoint and a current output of the mapping sensors, as described above.

Alternatively, the robotic system can execute a waypoint defining a GPS location and compass heading and can confirm achievement of the waypoint based on outputs of a GPS sensor and compass sensor within the robotic system. However, the robotic system can implement any other methods or techniques to navigate to a position and orientation within the store within a threshold distance and angular offset from a location and target orientation defined in a waypoint.

7. Photographic Image and Image Metadata

Block S112 of the method Sioo recites, based on an image specification defined by the preset waypoint, capturing a photographic image through a first camera in a set of cameras arranged in the robotic system. Generally, in Block S112, the robotic system captures a digital photographic image (or "image") through each camera designated in a current waypoint once the robotic system has navigated to the current waypoint in Block S110, as shown in FIGS. 1 and 5. In particular, once the robotic system has reached a position within a store within a threshold distance of an angular offset from the (x,y,∂) location and orientation specified in a waypoint, the robotic system can trigger select integrated optical sensors (e.g., RGB CMOS or CCD cameras) to capture images according to the camera addresses defined in the waypoint and then store these images in local memory. (Alternatively, once the robotic system reaches the location defined in the waypoint, the robotic system can articulate select cameras to positions defined in the waypoint and then store these images in local memory.)

Once the robotic system captures an image, the robotic system can write various metadata to the image, such as: an identifier ("ID") of the robotic system; a timestamp indicating a date and time the image was captured; an actual position of the robotic system at the time the image was captured (e.g., a GPS position and/or an (x,y,∂) location and target orientation determined from a comparison between the master map and outputs of the mapping sensors); and an address of the camera that captured the image. The robotic system can also write the corresponding waypoint in its entirety or an identifier (e.g., a UUID, a unique numerical label) of the corresponding waypoint to the image metadata. Alternatively, the robotic system can extract various data from the waypoint—such as the location, target orientation, and addresses of the aisle, shelving structure, shelving segment, shelves, and/or slots expected to be in the field of view of the particular camera that captured the image—and write these data to the image metadata. However, the robotic system can store any other data with an image captured during a scan cycle within a store.

The robotic system can then upload these images to the remote computer system for processing, as described below. For example, the robotic system can transmit an image to a local Internet-connected wireless router substantially in real-time once the image is captured and tagged with metadata, as shown in FIGS. 1 and 5. In another example, the robotic system can transmit batches of images to the wireless router asynchronously during or upon completion of the scan cycle. Alternatively, the robotic system can execute all or select Blocks of the method S100 described below to process images locally.

8. Image Collection

Block S120 of the method Sioo recites accessing a first image including visual data recorded by a mobile robotic system at a first time in Block S120, the first image associated with a first location and a first orientation of the mobile robotic system within the store at the first time. Generally, in Block S120, the system accesses visual data collected by the robotic system while occupying a waypoint within the store or traversing a path within the store (e.g., during a scan cycle).

In Block S120, the computer system can download from the robotic system digital photographic images (e.g., "raw images") recorded through one or more cameras integrated into the robotic system, wherein each raw image contains various metadata, such as the location, orientation, and/or waypoint occupied by the robotic system when the image was recorded, a time the image was recorded, an identifier or location of the camera on the robotic system that recorded the image, etc., as shown in FIGS. 1 and 5. For example, the robotic system can upload these images to the computer system over a cellular connection or via a computer network (e.g., the Internet) substantially in real-time. Alternatively, the robotic system can store these raw images in local memory and upload groups of raw images to the computer system en bloc (e.g., as a block of images recorded along one shelving structure or along one aisle of the store).

Upon receipt of images from the robotic system, the system (e.g., the remote computer system) can assimilate these raw images for subsequent processing. In one example, the system dewarps a raw image to remove fisheye effects resulting from a wide-angle lens connected to the camera that recorded the image and then processes this corrected image in subsequent Blocks of the method S100. In another example, the system can: compare the actual position and orientation of the robotic system at the time the raw image was captured (e.g., as stored in image metadata) to the target location and target orientation defined in a nearest waypoint; transform (e.g., skew, dewarp) the raw image to represent a field of view of the camera were the robotic system positioned at the target location and orientation defined in the waypoint; and then processes this corrected image in subsequent Blocks of the method S100. However, the system can modify, dewarp, or otherwise manipulate an image captured by the robotic system in any other way.

In another implementation, the system (e.g., the remote computer system) stiches multiple raw images recorded by the robotic system at one waypoint or along multiple adjacent waypoints into a larger (e.g., panoramic) image of one complete shelving segment or shelving structure. In one example, the system: receives a first set of digital photographic images recorded by a set of discrete color cameras integrated into the mobile robotic system at approximately a first time while the robotic system occupies a first waypoint (e.g., a first location and first orientation of the robotic system at the first time) adjacent a first shelving segment within the store; and assembles the set of digital photographic images into a first composite image based on known positions of the set of discrete color cameras within the mobile robotic system. In this example, the system can then: write an address of the first waypoint (or the first location and first orientation of the robotic system when the set of raw images were recorded) and the first time to metadata of the first correct image; and process this larger, composite image in subsequent Blocks of the method S100.

Alternatively, in the foregoing implementation, the system can stitch images—recorded by cameras offset vertically along the mast of the robotic system and recorded along a sequence of adjacent waypoints along a particular shelving structure—into a single panoramic image of the particular shelving structure. The system can then segment the panoramic image into discrete regions, where each region corresponds to one shelving segment, one shelf, or one slot within the particular shelving structure, such as according to methods and techniques described below.

9. Image Segmentation

In one variation, the system implements computer vision techniques to detect and extract features from an image (e.g., a corrected raw image or a composite image) indicating delineation of adjacent shelving segments within one shelving structure, adjacent shelves within one shelving segment, adjacent slots assigned to one shelf, and/or discrete products arranged on one shelf. The system can then segment the image into discrete regions accordingly and process each region of the image separately to identity presence, absence, and/or orientation of one or more products in each image region.

9.1 Shelving Segment Segmentation

In one implementation, the system implements computer vision techniques to distinguish a shelving segment represented within an image (e.g., a panoramic image of a shelving structure containing multiple shelving segments). In one example, the system scans the image for an area of interest including the shelving structure and crops the image around this area of interest, such as by cropping the image around a lowermost linear edge and around an uppermost (linear or nonlinear) edge in order to remove areas of the image representing a floor surface in front of the shelving structure and a ceiling and open volume above the shelving structure. In this example, the system can then: scan the area of interest in the image for (substantial, approximately) continuous vertical lines, such as by detecting features in the image and extracting substantially vertical, substantially linear curves extending from proximal the bottom to proximal the top of the area of interest; extract a region of the area of interest in the image (or crop the area of interest in the image) between two adjacent vertical lines offset by a real distance approximately a known width of shelving segments in the shelving structure; and label this region or area of interest of the image as representing a single shelving segment. The system can also implement methods and techniques described below to write an address of the shelving segment to this image region.

The system can repeat this process for each other region of the image between two vertical lines (e.g., substantially linear curves extending from proximal the bottom to proximal the top of the area of interest in the image) delineating discrete shelving segments within the shelving structure.

9.2 Shelf Segmentation

In one variation shown in FIGS. 1 and 4, the method S100 includes Block S122, which recites detecting a first shelf represented proximal a first region of the first image. Generally, in Block S122, the system can segment an image (e.g., a corrected image, a composite image cropped around a shelving segment) into regions corresponding to areas or volumes above discrete shelves in a shelving segment represented in this image.

In one example, the system implements methods and techniques described above to crop a composite image of all or a portion of a first shelving structure around a first shelving segment. In this example, the system then: detects features in the image; extracts—from this set of features—a first linear feature extending laterally across (substantially a full width of) the image; extracts—from this set of features—a second linear feature extending laterally across (substantially the full width of) the image and offset below the first linear feature by a distance approximating a common shelf thickness or a known shelf thickness of shelving structures throughout the store; and correlates the first linear feature and the second linear feature with a first shelf in the first shelving segment—that is, the upper leading edge and the lower leading edge of the first shelf. In this example, the system can similarly: extract—from this set of features—a third linear feature extending laterally across the image and offset above the first linear feature; extract—from this set of features—a fourth linear feature extending laterally across the image and offset below the third linear feature by a distance approximating the common or known shelf thickness; and correlate the third linear feature and the fourth linear feature with a second shelf in the first shelving segment above in the first shelf in the first shelving segment.

In the foregoing example, the system can then define a first region of the image extending from proximal the first linear feature to proximal the fourth linear feature above and extending across the full width of the image cropped to the width of the first shelving segment. The system can thus extract a first region of the first image—cropped or otherwise bounded around the first shelving segment—corresponding to an accessible volume above the first shelf in the first shelving segment in the first shelving structure. The system can repeat this process for each other shelf in the first shelving segment and in each other shelving segment throughout the store to generate a set of image regions, each representing an area or volume above one shelf in the store.

The system can also implement methods and techniques described below to write an address of a shelf represented in each image region. However, the system can implement any other methods or techniques to segment an image of a shelving structure or shelving segment around a single shelf represented in the image.

9.3 Product Segmentation

In this variation, the method S100 can also include Block S124, which recites extracting a first set of features from the first region of the first image. Generally, in Block S124, the system can segment an image—cropped or otherwise bounded around a shelving structure, around a shelving segment, or above a single shelf—by discrete objects placed on this shelving structure, shelving segment, or shelf.

In one example, the system implements computer vision techniques to: detect features in a first region of a first image cropped around an area or volume above a first shelf; and to detect a set of discrete objects arranged across the first shelf in the first region of the first image, such as by identifying edge features delineating bounds of each of these objects. The system can then: extract a first subregion in the first region of the first image or crop the first region of the first image around a first subregion corresponding to a first discrete object—in the set of discrete objects—shown in a first position on the first shelf in the first image; and repeat this process for other discrete objects detected in the first region of the first image to generate a set of discrete image subregions, each representing one discrete object arranged in a unique location on the first shelf.

Once a subregion of an image is cropped or otherwise bounded around an object represented in the image, the system can implement methods and techniques described below to extract features from this subregion and to then identify this object as a unit of a particular product responsive to correlation between these features and features in a template image representing the particular product. However, the system can implement any other methods or techniques to segment an image of a shelving structure or shelving segment around a single shelf represented in the image.

9.4 Slot Segmentation

In this variation, the system can also segment an image—cropped or otherwise bounded around a shelving structure, shelving segment, or shelf—by slots.

In one example, the system: implements methods and techniques described above to detect the upper leading edge and lower leading edge of a first shelf in a first image cropped around a first shelving segment; detects features in a section of the first image between the upper leading edge and the lower leading edge of the first shelf; identifies groups of features along this section of the first image as shelf tags affixed to the first shelf; and detects a left edge of each identified shelf tag. For a first region of the first image representing the first shelf in the first shelving segment, the system can then associate a subregion of the image 1) extending laterally from the left edge of a first shelf tag to the left edge of a second shelf tag to the right edge of the first shelf tag (or to the right edge of the image) and 2) extending vertically from the upper leading edge of the first shelf to the lower leading edge to a second shelf above (or to the top edge of the image) within a single slot. The system can repeat this process for other subregions in the first region of the image to detect multiple discrete slots on the shelf.

In this example, the system also extracts relative positions of these shelf tags from this section of the image of the first shelving segment and compare these relative positions to relative slot positions assigned to the first shelf by the planogram in order to confirm that real positions of these shelf tags align to the current stocking plan of the store. In this example, the system can define slot positions along the first shelf based on shelf tag locations, as described above, if the number and relative positions of these shelf tags match the planogram; otherwise, the system can project slot locations defined in the planogram onto the image of the first shelving segment or onto the first region—in the image—of the first shelf, as described below.

In this example, the system can also: read a barcode, extract a SKU or other product identifier, and/or read a price from a first shelf tag detected in the first image; confirm that these data read from the first shelf tag align to data assigned to the adjacent slot (e.g., above and to the right of the first shelf tag) by the planogram. If data read from the first shelf tag align to data specified in the planogram, the system can define a first slot position relative to the first shelf tag in the image, as described above, and treat these shelf tag data as ground truth for the slot. Otherwise, the system can flag the first shelf tag for correction in Block S160 and treat the planogram as ground truth for the first slot, such as by projecting slot locations defined in the planogram onto the image to define the first slot, as described below.

In another example, the system identifies a region in an image corresponding to a slot by automatically delineating regions in the image according to slot dimensions for the shelf, such as stored in a slot index or defined by the planogram. In this implementation, the system can: retrieve a shelf address—for a shelf in the field of view of the camera that captured the image, as described below—directly from the image metadata (e.g., from the waypoint linked to the image or by referencing the location and orientation of the robotic system when the image was recorded to the planogram); retrieve slot dimensions (e.g., slot widths) and slot positions for slots on the particular shelf by passing the shelf address into a slot index (e.g., a spreadsheet); and map slot dimensions, slot positions, and slot addresses assigned to the shelf onto the image (e.g., onto the first region of the image corresponding to the first shelf). In this example, the system can anticipate the vertical position of the particular shelf in the image based on the address of the particular camera, which is linked to the vertical position of the particular camera on the robotic system, and based on the address of the particular shelf, which is linked to a vertical position of the particular shelf in a particular shelving segment of known location within a particular shelving structure in the store. In this example, the system can then implement computer vision techniques (e.g., edge detection) to detect the full span of the particular shelf (e.g., a four-foot-long shelf) in the image based on the anticipated vertical position of the particular shelf in the image, map a string of slot widths—defined in the slot index—to the region of the image corresponding to the particular shelf, and thus delineate regions in the image above the particular shelf as distinct slots according to the string of slot widths.

The system can thus delineate "slot regions" (e.g., a row of rectangular slot regions) in the image corresponding to predefined slots on a shelf shown in an image. Furthermore, the slot index (or product location database or planogram) can assign a SKU to each slot address, and the system can project a SKU from the slot index onto a region in the image representing the corresponding slot address.

In a similar implementation, the system can identify a region in the image corresponding to a slot on a shelf represented in the image by mapping a section of a planogram directly to the image and delineating regions of the image according to product facings shown in the planogram. In this implementation, the system can: retrieve a shelving structure address and a shelving section address from the image metadata (or from the corresponding waypoint); retrieve a planogram for the shelving structure address; select a region of the planogram corresponding to the shelving segment represented in the image; and then implement computer vision techniques to skew, scale, translate, and/or rotate the selected region of the planogram into alignment with the field shown in the image, such as by detecting edges in images corresponding to faces of shelves and aligning shelf edges in the planogram to shelf edges detected in the image. The system can then segment the image into one slot region for each facing specified in the selected region of the planogram and write SKUs from slots defined in the planogram onto corresponding slot segments in the image.

10. Template Image Selection

Block S130 of the method S100 recites: accessing an address of the first shelf based on the first location, the first orientation, and a vertical position of the first shelf within the first image; and retrieving a first list of products assigned to the first shelf by a planogram of the store based on the address of the first shelf. Block S140 of the method S100 recites retrieving a first set of template images from a database of template images, wherein each template image in the first set of template images includes visual features of a product specified in the first list of products. Generally, in Block S130, the system identifies an address of a shelf represented in a region of an image and retrieves a list of products (e.g., a list of products) assigned to this shelf; in Block S140, the system can retrieve a relatively small subset (e.g., dozens) of template images representative of products in this list from a large database (e.g., millions) of template images representative of a wide range of products. In particular, in Blocks S130 and S140, the system reduces a relatively large database of available template images down to a small set of template images of products assigned to this shelf—and thereby substantially likely to be present on this shelf—represented in the image. The system can then compare features extracted from a region of the image over (or under) the shelf to features in template images in this relatively small set of template images in Blocks S150 and S152 to confirm the presence, absence, and/or orientation of units of products assigned to this shelf.

(The system can implement similar methods and techniques to: identify an address of a slot, a shelving segment, or a shelving structure represented in an image and to retrieve a list of products (e.g., a list of products) assigned to this slot, shelving segment, or shelving structure in Block S130; retrieve a relatively small set of template images representative of products in this list from the database of template images in Block S140; and confirm the presence, absence, and/or orientation of units of products assigned to this slot, shelving segment, or shelving structure based on correlation between features extracted from the image and features in the set of template images in Blocks S150 and S152.)

10.1 Template Image Database

The system maintains a database of template images, wherein each template image in the template image database: is associated with an identifier of a product (e.g., a SKU); and includes a photographic or graphical (e.g., computer drafted) representation of all or a portion of the product or packaging of the product. Each template image in the template image database can also be tagged with a product description, supplier, supply period, graphics release date, secondary graphic, barcode, color palette, packaging profile (e.g., packaging shape and size), and/or other quantitative or qualitative product packaging feature or descriptor. Furthermore, each template image in the template image database can be tagged with a product packaging orientation. For example, for one product associated with a particular SKU and packaged in a six-sided box, the template image database can include: a first template image squarely showing the front (or "primary") face of the box and tagged accordingly; a second template image squarely showing the rear face of the box and tagged accordingly; a third template image squarely showing the right face of the box and tagged accordingly; a fourth template image squarely showing the left face of the box and tagged accordingly; a fifth template image squarely showing the top face of the box and tagged accordingly; and a sixth template image squarely showing the bottom face of the box and tagged accordingly. In this example, the template image database can further include: a seventh template image showing the box angled to evenly expose both the front face and right face of the box and tagged accordingly; an eighth template image showing the box angled to expose the front face, right face, and the top face of the box and tagged accordingly; etc. For each product represented in the template image database, the template image database can also contain: multiple template images representing various lighting conditions on a representative unit of the product; damaged examples of the product packaging (e.g., dented cans, torn boxes); and/or seasonal product packaging (i.e., product packaging supplied during particular seasons or periods of time); etc.

In one variation, rather than visual data, template images in the template image database can include multi-dimensional matrices or vectors representative of visual features on product packaging. For example, the system can: aggregate and maintain a database of stock and field images products; implement computer vision techniques to extract features from these stock and field images and transform these features into multi-dimensional vectors; and then populate the template image database with template images in multi-dimensional vector form. Thus, in this example, the system can: retrieve a set of multi-dimensional vectors in Block S130, each multi-dimensional vector in the set of multi-dimensional vectors defines features representative of a product in a list of products assigned to a shelf, shelving segment, or shelving structure, etc. in Block S130. When matching a multi-dimensional vector in this set to a product represented in an image of the shelf, shelving segment, or shelving structure, the system can: segment a first subregion of the image representing a shelf in a shelving segment in Block S122; identify a first subregion in a first region of the image bounding a first discrete object in the image; implement computer vision techniques to detect and extract a first set of features—including geometry, color, and/or text features, etc. from the first subregion in the first region of the image; and calculate a composite score for correlations between features in the first set of features extracted from the first subregion of the image and features defined by a first multi-dimensional vector, in the set of multi-dimensional vectors retrieved from the template image database, representing a first product; and then identify the first object represented in the first subregion of the image as a unit of the first product in Block S150 if the composite score exceeds a threshold score, and vice versa in Block S152.

However, the template image database can include template images representing any other views of a product or product packaging and including (e.g., tagged with) any other relevant data.

10.2 Filtering the Template Image Database by Shelving Structure

In one implementation, the system selects a set of template images—from the template image database—representing visual features of products assigned to slots along the height and length of a shelving structure. In this implementation, the system can read a shelving structure address (or "ID") stored in metadata of the image, retrieve the shelving structure address associated with a waypoint (approximately) occupied by the robotic system when the image (or a related raw image) was recorded, or project the location and orientation of the robotic system when the image (or related raw image) was recorded into an architectural plan of the store to determine the address of the shelving structure in Block S130. The system can then pass the shelving structure address into the planogram, a slot index, a product location spreadsheet, or other product location database associated with the store to retrieve a list of products (e.g., a list of products) assigned to slots across this shelving structure in Block S130.

The system can then retrieve a set of template images—from the database of template images—showing one or more sides of products in this list of products in Block S140. For example, a shelving structure within a store can be stocked with 80 unique product facings. In this example, the system can: amass a list of 80 unique SKUs designated for stocking on this shelving structure in Block S130 based on the shelving structure address stored in the image metadata and the product location database; and aggregate a set of 80 template images from a database of millions of template images associated with millions of unique products in Block S140, wherein each selected template image in the set represents a primary face of a packaging (e.g., a front face of a box, bag, can, or bottle, etc.) for one product in the list of products associated with the shelving structure address.

In the foregoing example, for the set of 80 unique products assigned to the shelving structure, the system can aggregate 480 template images—from the database of millions of template images—for subsequent comparison to the image, wherein each template image represents one of six sides of a packaging for one product assigned to the shelving structure, and wherein the set of 480 template images includes one template image of each side of a packaging of each of the 80 products. Alternatively, the system can retrieve—from the template image database—all available template images (or all prioritized or highest-ranking template images) for products assigned to the shelving structure by the planogram, such as: three template images (e.g., template images at 0°, 120°, and 240° positions about the product's vertical axis, as available) for a bottled or canned product; two template images (e.g., front and back template images, as available) for a bagged product; and six template images (e.g., front, back, left, right, top, and bottom template images, as available) for a boxed product. The system can also prioritize or select template images representing current known packaging designs of products assigned to the shelf. For example, the system can filter the set of template images—retrieved from the database of template images—to include template images: representing only seasonal product packagings for a current season; or representing both standard product packaging and seasonal product packagings for the current season, if different from the standard product packaging. The system can also selectively filter template images—retrieved from the template image database—to represent both a previous product packaging of a particular product and a new product packaging of the particular product during transition from the previous product packaging to the new product packaging for the particular product. In yet another example, the system can filter template images in the template image database by lighting condition, such as to match a known, measured, or detected lighting condition proximal the shelving structure when the image (or the original raw image) was recorded.

However, the system can filter template images of images retrieved from the template image database by any other parameter in Block S140 in order to accumulate a relatively small set of template images containing (or defining) visual information representative of products (i.e., product packagings of products) most likely to be located on the shelving structure and shown in the image.

10.3 Filtering the Template Image Database by Shelving Segment

In another implementation, the system selects a set of template images—from the template image database—representing visual features of products assigned to slots in a single shelving segment within a shelving structure. In this implementation, the system can implement methods and techniques described above to access an address of a shelving segment represented in an image in Block S130, such as by: retrieving a shelving segment address associated with a waypoint at which the image (or a related raw image) was recorded; or querying the planogram or architectural plan of the store with the location and orientation of the robotic system at the time the image (or the related raw image) was recorded to retrieve the address of the shelving segment facing the robotic system at this time. The system can then: pass the shelving segment address into the product location database to retrieve a list of products (e.g., a set of SKUs) assigned to shelves within the shelving segment in Block S130, as described above; and aggregate a relatively small set of template images—from the template image database—containing data (e.g., in image, vector, or matrix format) representing products (e.g., product packagings) in the list of products assigned to the shelving segment in Block S140.

For example, for a list of 20 products assigned to a particular shelving segment associated with a particular shelving segment address, the system can aggregate 20 template images—from the database of millions of template images—for subsequent comparison to an image of the particular shelving segment in Blocks S150 and S152, wherein each template image represents a primary face of a product packaging for one product in the list of products assigned to the particular shelving segment. In this example, the system can also aggregate additional template images of products in this list of products, such as representing alternate or seasonal product packaging, other sides of product packagings, or damaged product packagings of these products, as described above.

10.4 Filtering the Template Image Database by Shelf

In yet another implementation, the system selects a set of template images—from the template image database—representing visual features of products assigned to slots in a single shelf within a single shelving segment in the store. In this implementation, the system can: retrieve a shelving segment address, as described above; detect a vertical location of the particular shelf within the shelving segment shown in the image (e.g., in Block S122); and retrieve an address of the particular shelf based on the shelving segment address and the vertical position of the particular shelf. The system can then: pass the shelf address into the product location database to retrieve a list of products (e.g., a set of SKUs) assigned to the particular shelf in Block S130, as described above; and aggregate a relatively small set of template images—from the template image database—containing data (e.g., an image, vector, or matrix format) representing products (e.g., product packagings) in the list of products assigned to the particular shelf in Block S140.

For example, for a list of five products assigned to the particular shelf, the system can aggregate a set of five template images for subsequent comparison to the image, wherein each template image in this set of five template images represents a front face of one product in the list of products. In this example, the system can also aggregate additional template images of products in this list of products, such as representing alternate or seasonal product packaging, other sides of product packagings, or damaged product packagings of these products, as described above.

10.5 Filtering the Template Image Database by Slot

In another implementation, the system selects a set of template images—from the template image database—representing visual features of a single product assigned to a single slot on one shelf within a single shelving segment in the store. In this implementation, the system can: retrieve an address of a shelf containing the particular slot, as described above; detect a horizontal location of the particular shelf within the shelving segment shown in the image; and retrieve an address of the particular slot based on the shelf address and the horizontal position of the particular slot along the shelf. In Block S140, the system can then: pass the slot address into the product location database to retrieve a SKU of a single product assigned to the particular slot, as described above; and retrieve a single or a relatively small set of template images—from the template image database—containing data (e.g., in image, vector, or matrix format) representing this single product assigned to the particular slot.

10.6 Filtering the Template Image Database by Shelf Tag Data

In one variation, the system: implements computer vision techniques to detect a product label on a shelf within the image; reads a barcode, QR code, SKU, product description, and/or other product identifier in Block S130; selects a set of template images tagged with the same barcode, QR code, SKU, product description, facing count, and/or other product identifier in Block S140; and assigns the set of template images to a slot region in the image proximal (e.g., above) the product label. In this variation, the system can then determine the status of a product arranged on the shelf in the corresponding slot in Block S152 based directly on product facing count and product identifier data appearing on a product label applied to a shelf. Alternatively, the system can retrieve stocking requirements for the slot by passing the product identifier read from the product label into a product location database and compare these stocking requirements to data tagged to a template image matched to the slot region in the image to determine the stocking status of the slot, as described below.

However, the system can implement any other methods and techniques to select a relatively small set of template images—from a relatively large set of template images—for comparison to one or more regions (or "slot regions") in the image.

The system can therefore aggregate a set of template images—from the template image database—for comparison with the image based on: the position of the robotic system at the time the image was captured; an aisle, a shelving structure, a shelving segment, a shelf, and/or a slot proximal the position of the robot; and SKUs of products designated for stocking within this aisle or on this shelving structure, shelving segment, shelf, and/or slot. In particular, the system can aggregate a set of template images—for subsequent comparison to the image to identify the presence or status of products stocked on the shelving structure—corresponding: to a single product designated for a particular slot to multiple products designated for slots above, below, and/or beside the particular slot; to multiple products designated for a single shelf; to multiple products designated for a set of shelves in a single shelving segment; to multiple products designated for multiple shelving segments in a single shelving structure; or to multiple products designated for two opposing shelving structures; etc., as defined in a product location database, a planogram, a slot index, etc. In Block S140, the system can assemble this set of template images that includes images of various sides, lighting conditions, orientations, graphics release, etc. from product packaging of each product identified in Block S130. However, the system can implement any other method or technique to link one or more SKUs to the image, and the system can populate a relatively small set of template images from a relatively large database of template images in any other way and according to any other parameter.

10.6 Current Planogram

In the foregoing implementations, the system can collect a list of products in Block S130 and a corresponding set of template images in Block S140 that conform to time constraints for the image. In particular, the system can: extract a date and time of the image from a timestamp stored in metadata of the image (or in metadata of the related raw image); select a product location database, planogram, etc. current on the date and at the time of the image timestamp, as shown in FIG. 1; and aggregate a list of products assigned—to a slot, shelf, shelving segment, or shelving structure, etc. shown in the image—by this current product location database, current planogram, etc. For example, products in the store may be rearranged or removed and new products may be added to the store over time, such as in preparation for an upcoming holiday, in anticipation of seasonal changes, etc., such as on a daily, weekly, monthly, quarterly, or annual basis, and these changes may be defined across a set of planograms for the store. The system can therefore aggregate a list of products (e.g., SKUs) assigned to a particular slot, shelf, shelf segment, or shelving structure, etc. by a current planogram (or by a current product location database containing data from the current planogram) in Block S130 in order to accommodate such daily, weekly, monthly, quarterly, annual, scheduled, and unscheduled changes to product location assignments throughout the store.

Similarly, in Block S140, the system can select template images current to the time an image was recorded (e.g., current to the timestamp stored in the image metadata). For example, for each product specified in a list of products generated or accessed in Block S130, the system can aggregate a set of template images representing both the current (e.g., "newest," latest) product packaging and a most-recent former product packaging of the product in Block S140. In this example, in Blocks S150 and S152, the system can: prioritize comparison of the current packaging template images to a corresponding region in the image to detect presence of units of these products in their current packagings; and then compare template images of the previous packagings of these products to the corresponding region in the image if matches to the current packaging template images are not confirmed. The system can therefore aggregate both current and outdated template images in Block S140 in order to support detection of current and outdated (e.g., "expired") product packagings in Block S150.

The system can implement similar methods and techniques in Block S140 to collect graphics, text, barcodes, color palettes, packaging profiles (e.g., shapes), and/or other quantitative or qualitative product packaging features—from a database of quantitative or qualitative product packaging features of a large population of products—representative of products in the (small) list of products in preparation for detecting and characterizing products shown in an image recorded by the robotic system.

11. Product Identification and Stocking Status

Block S150 of the method S100 recites confirming presence of a unit of a first product, in the first list of products, on the first shelf in Block S150 in response to correlation between features in the first set of features and features in a first template image, in the first set of template images, representing the first product. Generally, in Block S150, the system: detects the presence of a unit of a particular product—corresponding to a template image selected in Block S140—on a particular shelf by matching features in a template image associated with the particular product to features extracted from a region of the image; and confirms that the presence and location of the particular product on the particular shelf aligns with stocking requirements assigned to a corresponding slot by the planogram of the store.

Similarly, Block S152 of the method S100 recites determining that a unit of the first product is improperly stocked on the first shelf in response to deviation between features in the first set of features and features in the first template image. Generally, in Block S152, the system determines that a particular slot is empty of product, contains a product that is misoriented, contains an incorrect product, or has otherwise deviated from stocking requirements specified in the planogram based on a mismatch of features represented in a template image of a product assigned to a slot shown in an image and features extracted from a region of the image corresponding to this slot. In particular, the system can execute Blocks S150 and S152 to determine whether: a product facing is present; the primary side of a product packaging is facing outwardly on a shelf (i.e., the product is properly oriented on a shelf); the product packaging is upright; the product packaging is set at the right depth on the shelf; the product packaging is damaged; the correct number of facings of a product are showing; product packagings are current; etc. based on product locations and other stocking requirements defined by a planogram, product location database, or other product stocking documentation.

11.1 Feature Matching

In Block S150, the system can implement template matching techniques to compare regions (or subregions) of an image to a set of template images representing a set of products specifically assigned to a slot, shelf, shelving segment, or shelving structure shown in the image. For example, the system can: segment an image by shelf; extract a first region of the image corresponding to a first shelf shown in the image; crop the first region around objects shown on the first shelf (i.e., remove a background area from the first region); and implement edge detection, object detection, or other computer vision techniques to identify discrete subregions in the first region of the image, wherein each subregion represents a single object (e.g., a single unit of a product) arranged on the first shelf. (In this example, the system can also project a slot dimension defined in the planogram for the first shelf onto the first region of the image to inform or guide detection of discrete objects on the first shelf.) The system can then implement template matching techniques to compare each subregion of the first region of the image to template images in the set of template images selected for the first shelf until a match is found or until the set of template images is exhausted for each subregion.

In the foregoing example, the system can also: extract a predominant color or a representative spectrum of relative color values from a first subregion of the first region of the image; and then rank, prioritize, or filter the set of template images for comparison to the first subregion according to similarities between the predominant color or a representative spectrum of relative color values in the template images and the first subregion of the image. Similarly, the system can: implement optical character recognition, object detection, or other computer vision techniques to extract text and/or object geometry from the first subregion of the image; and then rank, prioritize, or filter the set of template images for comparison to the first subregion according to similarities between text shown on and/or the geometry of products represented in the template images and in the first subregion of the image. However, the system can rank, prioritize, or filter the set of template images for comparison to the first subregion of the image based on any other feature read or extracted from the first subregion of the image. The system can then systematically compare template images—of products assigned to the first shelf—to the first subregion of the image according to rank or priority until a match is found or until the set of template images is exhausted for the first subregion. The system can repeat this process for each other subregion in the first region of the image.

Furthermore, in this example, the system can calculate a score (e.g., a "confidence score," a "similarity score") for a match between a subregion of the image and a template image in the set of template images representing products assigned to the first shelf, such as proportional to a number of matched features occurring in similar relative positions in the subregion and the template image. For example, the system can: calculate a similarity score between a first subregion in the image and each template image in the set of template images of products assigned to the first shelf; identify an object represented in the first subregion as a first product in response to the similarity score between the first subregion and a first template image—representing the first product—exceeding all other similarity scores for template images in the set and exceeding a preset threshold similarity score. In particular, in the foregoing implementations, the system can identify a discrete object represented in a first subregion of the first region of the image as a unit of a first product in Block S150 in response to relatively strong correlation between features extracted from the first subregion of the image and features represented in a first template image representing the first product. The system can then tag the first subregion of the image with a SKU or other identifier of a product represented by the first template image. Furthermore, if the first template image is tagged with additional data, such as packaging side, packaging orientation, product description, supplier, supply period, graphics release date, packaging damage, etc. of the first product, the system can also copy these data to the first subregion of the image, such as in the form of tags or image metadata.

However, if the system fails to calculate a similarity score between the first subregion of the first region of the image and a template image in the set that exceeds the threshold similarity score, the system can determine that no product represented in the set of template images is properly stocked (e.g., present, oriented) in a position on the first shelf corresponding to the first subregion in Block S152; accordingly, the system can then flag the first subregion of the image for comparison to a larger set of template images of products assigned to other shelves, shelving segments, and/or shelving structures nearby.

Alternatively, the system can: scan a first template image—in the set of template images—across the width and height of the first region of the image; calculate a best position, orientation, and a similarity score for the first template image across the first region of the image; repeat this process for each other template image in the set; and then tag discrete subregions in the first region of the image with product identifiers from template images exhibiting greatest similarity scores over a threshold similarity score, as shown in FIG. 1. The system can thus tag or associate discrete subregions of the first region of the image with product identifiers from template images matched (e.g., exhibiting greatest similarity scores over a threshold similarity score) to these subregions in Block S150. In this implementation, if the system fails to calculate a similarity score between the first subregion of the first region of the image and a template image in the set that exceeds the threshold similarity score, the system can determine that no product represented in the set of template images is stocked on the first shelf or properly oriented on the first shelf in Block S152. Furthermore, if the system detects features representative of other than a bare shelf in a subregion of the image untagged or unmatched to a template image in the set, the system can flag this subregion of the image for comparison to a larger set of template images of products assigned to other shelves, shelving segments, and/or shelving structures nearby.

In the foregoing implementations, the system can implement template matching, edge detection, pattern matching, pattern recognition, optical character recognition, color recognition, content-based image retrieval, pose estimation, code reading, shape recognition, and/or any other suitable method or technique to detect an object in the first region of the image and to match this object to features represented or defined in a template image associated with a particle product. The system can repeat this process to match template images in the set to other subregions in the first region of the image and to tag these other subregions in the image with data from matched template images. The system can further repeat this process for each other region corresponding to other shelves represented in the image, for other images of each other shelving segment throughout the store, etc.

The system can also aggregate product identifiers (e.g., SKUs) and other product data thus linked to subregions in the image into a stock map (or a 2D image overlay, a spreadsheet, etc.) of products stocked on one shelf, on a shelving segment, or along a complete shelving structure shown in the image. For example, the system can transform subregions in the image in which discrete objects are detected and matched to template images into a stock map of slot containers on one or more shelves shown in the image, wherein each slot container is labeled with a product identifier (e.g., SKU), a packaging side, a packaging orientation, and/or other data extracted from a template image matched to the corresponding region in the image and whether an object is detected in the corresponding subregion of the image. Alternatively, in the variation described above in which the system delineates subregions in the image as discrete slots based on a slot index (or product location database, etc.) prior to comparing subregions of the image to template images, the system can generate a stock map of slot containers for each slot shown in the image based on the slot index (or product location database, etc.); when a region in the image is matched to a template image in Block 150, the system can then copy product data from the template image into the corresponding slot container in the stock map. The system can also flag a slot container in the stock map as empty or containing an incorrect product in Block S152 if features indicative of a product are not detected or if features indicative of the wrong product are detected in the corresponding subregion of the image, respectively. However, the system can store product identification and other data from template images matched to subregions in an image in any other format or container.

11.2 Product Orientation

Figure 2:
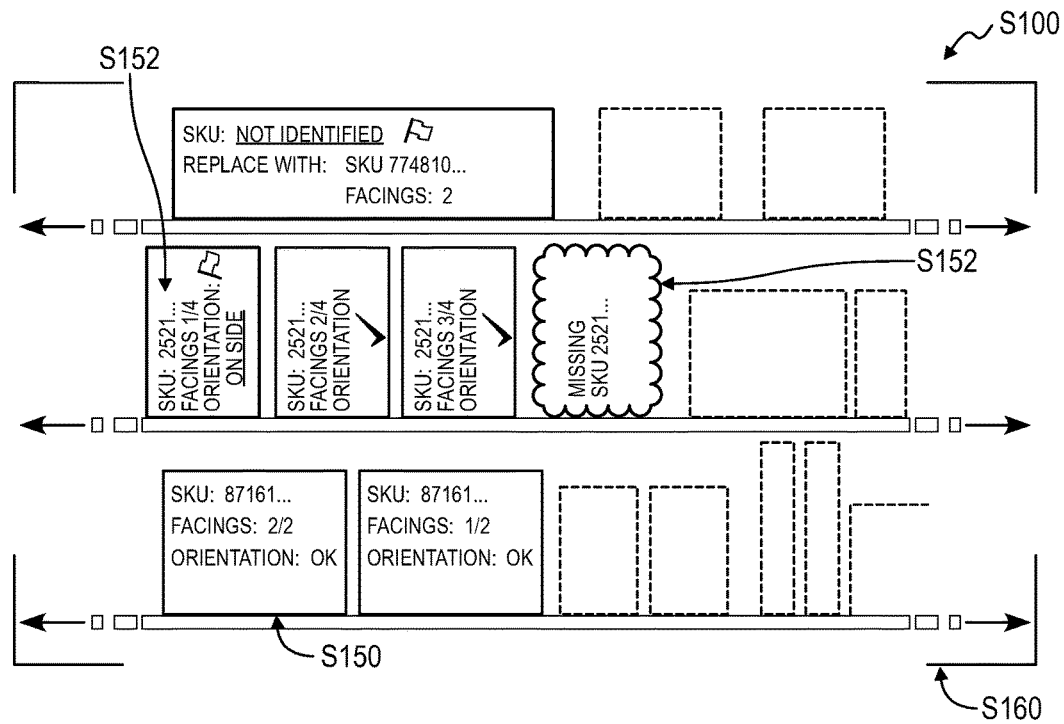
FIG. 2 is a graphical representation of one variation of the method.

In one variation shown in FIGS. 1 and 2, the system determines an orientation of a product identified in a subregion of an image based on presence and relative positions of features in an image representative of this product. The system can then store the detected orientation of this product in its corresponding slot container in the stock map in Blocks S150 and S152, as described above, and write a flag to this slot container if the orientation differs from an acceptable orientation range defined by the planogram.

In one implementation, the system: matches features—in a first set of features extracted from a first subregion of a first region of an image—to a first group of features defined in a first template image of a first product to confirm presence of a unit of the first product (e.g., a bottled or canned product) on the first shelf at a location corresponding to the first subregion in the image; confirms absence of a second group of features, defined in the first template image, from the first set of features extracted from the first subregion of the image; and then calculates an orientation of the unit of the first product on the shelf (e.g., a rotational orientation of the unit of the first product about a vertical axis) based on presence of the first group of features in the first set of features from the first subregion of the image, absence of the second group of features from the first set of features from the first subregion of the image, and relative positions of the first and second groups of features defined in the first template image.

In an implementation in which the template image database contains template images of the front face of products or images of known orientations relative to front faces of products, the system can calculate a transform that skews a template image into alignment with an object represented in a first subregion of a first region of an image when matching a template image to the first subregion in the image. Once a first template image is matched to the first subregion of the image, the system can calculate an angular rotation of a unit of the product represented in the first subregion of the image based on the transform that skews the first template image into alignment with the unit of the first object shown in the first subregion of the image.

Yet alternatively, the template image database can include template images of products in various known relative orientations, and the system can: select template images representing multiple orientations of products assigned to a first shelf in Block S130; match a subregion of a first image of the first shelf to one or a set of template images of a first product at one or more known orientations; and then interpolate between product orientations in matched template images to calculate an orientation of a unit of the first product represented in the first subregion of the image.

In the foregoing implementations, the system can then generate a restocking prompt to correct the calculated or estimated orientation of the unit of the first product on the first shelf if the orientation of the unit of the first product on the shelf differs from a target orientation (e.g., 0°) or target orientation (e.g., +/−10°) specified for the corresponding slot by the planogram. However, the system can implement any other method or technique to calculate or estimate the orientation of a unit of a product on a shelf in Block S1150 based on visual data contained in an image.

The system can implement similar methods and techniques to estimate a depth of a unit of a product from an edge of a shelf containing the product; and the system can similarly handle deviations between actual product depth and target product depth specified for the corresponding slot by the planogram.

1.1.3 Lateral Product Position

In another variation, the system determines lateral position of a product on a shelf and identifies discrepancies between the position of the product and a position assigned by the planogram based on relative positions of features detected in an image of this shelf. The system can then store the detected position of this product in its corresponding slot container in the stock map in Blocks S150 and S152, as described above, and write a flag to this slot container if the detected lateral position differs from an acceptable orientation range defined by the planogram.

In one implementation, the system: implements methods and techniques described above to detect a first shelf tag in an image; defines a boundary of a first slot in the image relative to the position of the first shelf tag; and confirms the lateral position of a unit of a product—assigned to the first slot—based on a proportion of features representative of this unit of the product contained within the boundary of the first slot. For example, the system can: identify a first shelf tag proximal a bottom edge of a first region of an image representing a first shelf; detect an object on the shelf proximal the first shelf tag; identify the first object as a unit of a first product on the first shelf in Block S150, as described above; extract a horizontal distance from a left vertical edge of the first shelf tag to a left vertical edge of the unit of the first product; and then determining that the unit of the first product is misoriented on the first shelf if this horizontal distance exceeds a threshold distance (e.g., a default threshold distance of a threshold distance specified by the planogram). In particular, the system can confirm that the left edge of a unit of a product detected on a shelf aligns to a left edge of a nearest shelf tag (or a shelf tag specifying the same product)—within a preset tolerance—and otherwise flag the unit of the product as misoriented on the shelf.

In another implementation, the system confirms the lateral position of a unit of a first product based on its relative distance from a unit of a second product detected on a shelf and a distance between these products assigned to the shelf by the planogram. For example, the system can: detect a set of discrete objects arranged across a first shelf represented in a first region of an image; identify a first subregion in the first region of an image corresponding to a first discrete object in the set of discrete objects; extract a first set of features from the first subregion in the first region of the first image; and identify the first discrete object as a unit of a first product, in the first list of products, in response to correlation between features in the first set of features and features in a first template image, in the first set of template images, representing the first product in Block S150. The system can repeat this process to identify a second discrete object, in the set of discrete objects, as a unit of a second product, in the first list of products, in response to correlation between features in a second set of features—extracted from a second subregion in the first region of the image—and features in a second template image, in the first set of template images, representing the second product. Once units of the first and second products are identified in the image, the system can detect improper arrangement of the unit of the first product and the unit of the second product on the first shelf if a lateral offset between a first position of the unit of the first product and a second position of the unit of the second product on the first shelf deviates from a target lateral offset assigned to the first product and the second product on the first shelf by the planogram.

In the foregoing implementations, if the system determines that a lateral position of a unit of a product relative to a corresponding shelf tag exceeds a preset tolerance in Block S152, the system can generate a restocking prompt to correct the orientation of the unit of the product on the shelf in Block S160. For example, the system can generate a restocking prompt specifying correction of relative positions of the unit of the first product and the unit of the second product in Block S160 in response to detecting improper arrangement of the first product and the second product on the first shelf in Block S150.

However, the system can detect and handle improper lateral arrangement of units of products on shelves in any other way.

1.1.4 Confirm Facing Count

In yet another variation shown in FIGS. 1 and 2, the system counts a number of product facings of a particular product detected on a shelf, compares this number of facings of the particular product on the shelf to a number of product facings of the particular product assigned to the shelf by the planogram, and writes flags to corresponding slot containers in the stock map if the actual number of facings of the particular product differ from (e.g., is less than or exceeds) the number of facing specified by the planogram.

In one example, the system: implements methods and techniques described above to confirm presence of a set of discrete units of a first product represented in a first region of an image corresponding to a first shelf in Block S150 (e.g., in response to discrete clusters of features in a set of features extracted from the first region of the image exhibiting strong correlation to features in a first template image representing the first product); generates a count of units of the first product in the set of discrete units of the first product detected on the first shelf; confirms proper stocking of the first product on the first shelf if the count equals a quantity of facings of the first product assigned to the first shelf by the planogram. However, in this example, the system can: detect improper stocking of the first product on the first shelf in response to the count deviating from the quantity of facings of the first product assigned to the first shelf by the planogram; and then generate a restocking prompt that specifies correction of facings of the first product on the first shelf in response to detecting improper stocking of the first product on the first shelf.

However, the system can implement any other method or technique to count product facings on a shelf shown in an image and to handle deviations between actual and target product facings specified in the planogram.

11.5 Packaging Variations

In another variation, the system identifies a product packaging of a product on a shelf, confirms that the product (e.g., the product SKU) is correct, and then determines whether this product packaging fulfills requirements of the planogram.

In one implementation, the system identifies a first object detected in a first subregion of an image as a unit of a first product by matching features represented in the first subregion of the image with a first template image of a first product in a known packaging variation and then compares the known packaging variation represented by the first template image to the planogram to confirm whether the unit of the first product fulfills stocking requirements defined by the planogram. For example, the system can: extract a first set of features from a subregion of an image corresponding to a first slot on a first shelf represented in the image in Block S124; retrieve a first template image of a first product in a current packaging and a second template image of the first product in a previous packaging—differing from the current packaging—assigned to the first slot by the planogram in Block S130; confirm presence of a unit of the first product, in the current packaging, in the first slot in response to correlation between features in the first set of features and features in the first template image; and confirm presence of the unit of the first product, in the previous packaging, in the first slot in response to correlation between features in the first set of features and features in the second template image. In this example, the system can then generate a restocking prompt to replace the unit of the first product in the previous packaging with a unit of the first product in the current packaging (and to dispose of the unit of the first product in the previous packaging) in response to confirming presence of the unit of the first product in the previous packaging on the first shelf. The system can therefore: determine whether a unit of product is present in an assigned slot on a shelf and confirm that this unit of the product is packaged according to a current packaging variation in Block S150; and otherwise flag the slot or unit of the product for correction. In particular, the system can accommodate changes to product packagings over time, such as seasonal product packaging changes, and implement the foregoing methods and techniques to confirm that units of products stocked throughout the store are packaged according to current packaging variations specified or allowed by the planogram.

Furthermore, in this variation, the system can confirm that a first object detected in a first subregion of an image is of a unit of a first product based on sufficient similarity between features extracted from the first subregion and features represented in one of more template images of the first product despite the unit of the first product in the first subregion of the image representing a packaging variation (e.g., a new packaging variation) other than those represented in template images of the same product retrieved in Block S130. For example, the system can predict presence of a unit of the first product, in a new packaging, on the first shelf in response to: similarities between features (e.g., text, graphics, barcodes, color palettes, packaging profiles) extracted from the first subregion and defined in a first template image of the same product in a different packaging; similarities between features extracted from the first subregion and defined in a second template image of the same product in another packaging; and detection of features in the first subregion of the image that are unique to both the first template image and the second template image. In this example, the system can then: store the subregion of the first region of the first image corresponding to the detected unit of the first product as a new template image of the first product in the new packaging; and write the new template image to the database of template images for future comparison to images of shelves assigned the first product by the planogram.

In the foregoing example, the system can also: flag the first subregion of the image for manual annotation of confirmation of the first product in the new product packaging; and/or generate a prompt to supply a stock image of the first product in the new packaging and return this prompt to an associate of the store or to a brand or supplier of the first product to improve identification of units of the first product in the new product packaging with a "clean" template image in the future. Therefore, the system can also detect and accommodate new packaging variations not yet known to the system while also completing an assessment of the stock state of slots throughout the store in Blocks S150 and S152.

11.6 Empty Slot

In yet another variation shown in FIG. 4, the system can detect an "empty" slot devoid of product based on features extracted from an image recorded by the robotic system.

In one implementation, the system: identifies a first subregion—of a first region of an image—corresponding to a first slot on a first shelf assigned the first product by the planogram in Block S122; extracts a first subset of features from the first subregion of the first image in Block S124; detects omission of a unit of a first product from the first slot on the first shelf in response to the first subset of features exhibiting less than a threshold correlation to features in the first template image in Block S152; and identifies the first slot on the first shelf as empty in response to correlation between features in the first subset of features and a second set of features representing empty shelves. For example, the system can populate a set of template images that includes both: template images of products assigned to a shelf represented in a region of an image; and template images of empty slots or shelves. In this example, the system can implement methods and techniques described above to compare template images of empty slots or shelves to subregions of an image to identify corresponding positions along a shelf shown in this image as empty (i.e., devoid of product).

In the foregoing implementation, the system can generate a restocking prompt for filling an empty slot with a number of units of a particular product—assigned to the slot by the planogram—in response to identifying the slot as empty. However, the system can detect and handle empty slots or empty shelves in any other way in Blocks S152 and S160.

11.7 Second Product on First Shelf and Products on Other Shelves

The system can repeat the foregoing processes for each of multiple subregions (e.g., representing discrete slots) within a region (e.g., representing a single shelf within a shelving segment) of an image (e.g., of a whole shelving segment or shelving structure) in order to identify products arranged in other slots represented in the image. The system can further repeat the foregoing processes for other images recorded by the robotic system throughout a scan of the store, as shown in FIG. 4.

For example, the system can: retrieve a first set of template images for a first shelf shown in a first image in Block S130; identify a unit of a first product on the first shelf by matching a first template image, in the first set of template images, to a corresponding subregion of the first image; identify a unit of a second product adjacent the unit of the first product on the first shelf by matching a second subregion of the first image to a second template image in the same first set of template images in Block S150. The system can then: retrieve a second set of template images for a second shelf shown in the first image in Block S130; identify a unit of a third product on the second shelf by matching a third template image, in the second set of template images, to a corresponding subregion of the first image; identify a unit of a fourth product adjacent the unit of the third product on the second shelf by matching a fourth subregion of the first image to a fourth template image in the second set of template images in Block S150. In this example, the system can later: retrieve a third set of template images for a third shelf shown in a second image in Block S130; identify a unit of a fifth product on the third shelf by matching a first template image, in the third set of template images, to a corresponding subregion of the second image; identify a unit of a sixth product adjacent the unit of the fifth product on the third shelf by matching a second subregion of the third image to a second template image in the third set of template images in Block S150; etc. The system can then compile restocking prompts for various slots—across multiple shelves, shelving segments, and/or shelving structures throughout the store—exhibiting deviation from the planogram into a global electronic restocking list in Block S160.

The system can thus populate a stock map of slot containers across many (e.g., substantially all) slots, shelves, shelving segments, and/or shelving structures throughout a store with stock state data extracted from images recorded by the robotic system while navigating throughout a store during a scan cycle. For example, the system can label each slot container in the stock map as one of: properly stocked responsive to alignment in the lateral position, depth, and vertical rotation of an object matched to a template image of a product assigned to the slot; properly stocked but misoriented responsive to detection of an object matched to a template image of a product assigned to the slot concurrent with deviation of the object from a lateral position, depth, or vertical rotation tolerance specified by the planogram; properly stocked but in incorrect packaging responsive to detection of an object matched to a template image of a product— in known incorrect (e.g., former, outdated) product packaging—assigned to the slot by the planogram; improperly stocked responsive to detection of an object not identified or matched to a template image of a product not assigned to the slot by the planogram; or empty responsive to failure to detect an object in the region of an image representing the slot. In this example, the stock map can mimic a form of the planogram but define a (approximately) true current stock state of the store. Alternatively, the stock map can be in the form of a spreadsheet, stock list (e.g., by slot address), etc. containing slot state data extracted from images recorded by the robotic system during a scan of the store.

However, the system can implement any other methods or techniques to identify real deviations from stocking requirements defined in a product location database, planogram, or slot index, etc. for the store.

12. Template Image Set Escalation

In one variation in FIG. 4, if the system detects an object in a subregion of an image but fails to identify a template image that matches the object with a sufficient similarity score, the system escalates a set of template images retrieved from the template image database to include template images of products assigned to a single shelf, then to multiple shelves within a single shelving segment, then to multiple shelving segments within a single shelving structure, and then to multiple shelving structures within a single aisle, etc. in Block S130. In particular, the system can grow a set of template images—for comparison to a particular object detected in a particular subregion of an image—as this set of template images representing products predicted to most lightly match the particular object fail to return positive results (i.e., positive matches) in order to: maintain a relatively high degree of efficiency in identifying products arranged on shelves throughout a store; while also accommodating deviations from a stocking plan defined by a planogram, such as due to patrons removing products and then returning these products to incorrect locations throughout the store or due to intentional or unintentional stocking changes executed by associates of the store.

For example, a patron may remove an item (i.e., a unit of a product) from a shelf, inspect the item, and then return the item to the same shelf or to a different shelf nearby. In another example, a patron may remove an item from a shelf, place the item in her basket, move down the same aisle, and then return the item—such as in favor of another item—to a shelf on a different shelving segment in the same shelving structure or even the opposing shelving structure. As described above, the system aggregates small sets of template images representing products assigned to singular shelves (or even singular slots) in order to achieve a relatively high degree of accuracy in template image selection and relatively rapid identification of a large proportion (e.g., 95+%) of products on shelves throughout the store. However, because patrons may move units of products throughout the store while shopping, the system can also expand a set of template images to include products assigned to multiple shelves, a whole shelving segment, multiple shelving segments, a complete shelving structure, two adjacent shelving structures, etc. in order to accommodate these unplanned, incidental stocking changes by patrons and to enable identification of units of products that may have been moved relatively short distances from their assigned slots based on strategic, targeted sets of template images.

12.1 Escalation to Shelving Segment

In one implementation, the system: identifies a first shelf, a first shelving segment containing the first shelf and a second shelf, a first shelving structure containing the first shelving segment and a second shelving segment, and a first aisle facing the first shelving structure and a second shelving structure in Block S122, as described above; identifies a first subregion in the first region of the first image corresponding to a first slot on the first shelf assigned a first product by the planogram in Block S122; extracts a first set of features from the first subregion of the first image in Block S124; retrieves a first set of template images or products assigned to the detects presence of an object in the first slot based on the first set of features in Block S150; and then identifies the object as other than a product in the first list of products in response to weak correlation (e.g., less than a threshold similarity) between the first set of features and features in template images in the first set of template images.

In this implementation, if the system detects presence of the object in the first slot and identifies the object as other than a product in the first list of products assigned to the first shelf, the system can: retrieve a second list of products assigned to the first shelving segment—containing the first shelf and additional shelves and/or slots—by the planogram in Block S130; remove products in the first list of products from the second list of products; and retrieve a second set of template images from the database of template images, wherein each template image in the second set of template images includes visual features of a product specified in the second list of products in Block S140. The system can then implement methods and techniques described above to identify the object as a unit of a second product, in the second list of products, in Block S150 in response to correlation between features in the first set of features and features in a second template image, in the second set of template images, representing the second product. Thus, if the system identifies the object as a unit of the second product, the system can generate a prompt to replace the unit of the second product—currently occupying the first slot—with a unit of the first product in Block S160.

In particular, the system can expand a set of template images—for comparison to a subregion of an image representing a detected object—from template images of products assigned to a single shelf containing the detected object to a complete shelving segment (or multiple shelves within the shelving segment) if the original set of template images of products assigned to the shelf exclusively fails to yield a sufficient match to the subregion of the image representing the object.

12.2 Escalation to Shelving Structure

Alternatively, in the foregoing implementation, the system can identify the object as other than a product in the second list of products (i.e., not a product assigned to the shelving segment containing the first shelf) in Block S152 in response to weak correlation between the first set of features extracted from the first subregion of the image and features in template images in the second set of template images of products assigned to the first shelving segment. Thus, in response to identifying the object as other than a product in the second list of products, the system can: retrieve a third list of products assigned to the first shelving structure—containing the first shelving segment and additional shelving segments, shelves, and/or slots—by the planogram in Block S130, wherein the third list of products excludes the first list of products and the second list of products; and retrieve a third set of template images from the database of template images in Block S140, wherein each template image in the third set of template images includes visual features of a product specified in the third list of products. The system can then identify the object as a unit of a third product, in the third list of products, in Block S150 in response to correlation between features in the first subset of features and features in a third template image, in the third set of template images, representing the third product. Thus, if the system identifies the object as a unit of the third product, the system can generate a prompt to replace the unit of the third product—currently occupying the first slot—with a unit of the first product.

In particular, the system can expand a set of template images—for comparison to the subregion of the image representing the detected object—from template images of products assigned to a single shelving segment containing the detected object to a complete shelving structure (or multiple shelving segments within the shelving structure) if the previous set of template images of products assigned to the shelving segment exclusively fails to yield a sufficient match to the subregion of the image representing the object.

12.3 Escalation to Aisle

Alternatively, in the foregoing implementation, the system can identify the object as other than a product in the third list of products (i.e., not a product assigned to the shelving structure containing the first shelving segment) in Block S152 in response to weak correlation between the first set of features extracted from the first subregion of the image and features in template images in the third set of template images of products assigned to the first shelving structure. Thus, in response to identifying the object as other than a product in the third list of products, the system can: retrieve a fourth list of products assigned to the first aisle—containing the first shelving structure and additional shelving structures, shelving segments, shelves, and/or slots—by the planogram in Block S130, wherein the fourth list of products excludes the first, second, and third lists of products; and retrieve a fourth set of template images from the database of template images in Block S140, wherein each template image in the fourth set of template images includes visual features of a product specified in the fourth list of products. The system can then identify the object as a unit of a fourth product, in the fourth list of products, in Block S150 in response to correlation between features in the first subset of features and features in a fourth template image, in the fourth set of template images, representing the fourth product. Thus, if the system identifies the object as a unit of the fourth product, the system can generate a prompt to replace the unit of the fourth product—currently occupying the first slot—with a unit of the first product.

In particular, the system can expand a set of template images—for comparison to the subregion of the image representing the detected object—from template images of products assigned to a single shelving structure containing the detected object to a complete aisle (or multiple shelving structures within the aisle) if the previous set of template images of products assigned to the shelving structure exclusively fails to yield a sufficient match to the subregion of the image representing the object.

The system can repeat this process to expand the set of template images to products assigned to shelving structures in multiple aisles, to shelving structures in a section of the store, or to the entire store over time until a match is found or until a limit is reached, such as: a maximum time allotted to identify the object in the first slot; a maximum template image set size; etc.

In this variation, the system can implement static limits for ceasing identification attempts for objects in all slots throughout the store. Alternatively, the system can implement custom or dynamic limits for ceasing identification attempts for objects in all slots throughout the store. For example, the system can set limits proportional to margin, demand, value to the store (e.g., a linear combination of margin and demand), cost, etc., such as described in U.S. patent application Ser. No. 15/347,689.

However, the system can implement any other methods or techniques to select and expand a set of template images for comparison to a region or subregion of an image in Blocks S150 and S152.

14. Output

Block S160 of the method S100 recites, in response to determining that the unit of the first product is improperly stocked on the first shelf, generating a first restocking prompt for the first product on the first shelf. Generally, in Block S160, the system serves a stocking status of one or more slots, shelves, shelving segments, shelving structures, etc. within the store to an entity associated with the store, such as including a prompt to manually correct presence, positions, and/or orientations of products on shelves throughout the store responsive to detected deviation from the current planogram of the store.

14.1 Stock Map

In one implementation shown in FIG. 2, the system outputs the stock map containing slot state data of (substantially) all slots in the store imaged by the robotic system during a scan. For example, the stock mat can include one 2D overlay for each shelving structure within the store, wherein each 2D overlay defines a vectorized line map delineating discrete slots in the shelving structure, containing a numerical indicator of a proportion of total product facings (e.g., ½, 50%) assigned to each slot in the shelving structure, and color-coded flags for empty, under-stocked, improperly stocked, and misoriented product facings in slots in the shelving structure. The system can align these 2D overlays over panoramic images of corresponding shelving structures and then serve these composite images to an associate (or a manager, corporate representative) through a manager portal, thereby enabling the associate to view both real visual data of the store and quantitative and qualitative stock data extracted from these visual data, as shown in FIG. 5.

14.2 Electronic Restocking List

The system can additionally or alternatively generate an electronic restocking list containing a filtered list of slots in need of correction throughout the store, such as addition of product, exchange of product, or straightening of product. For example, the system can generate a stocking status graph, table, or list of improperly-stocked slots throughout the store, such as including a mis-stocking mode (e.g., too many facings, too few facings, misoriented packaging, damaged packing, outdated packaging, etc.) for each improperly-stocked slot in this list, as shown in FIGS. 2 and 5. In this implementation, the system can serve this graph, table, or list to the manager of the store via a manager portal, such as executing on a desktop computer, a laptop computer, a tablet, or a smartphone, etc.

The system can also generate a stocking correction task list to correct improperly-stocked slots. In this implementation, the system can generate a prioritized list of tasks to move misplaced products, to restock empty or improperly-stocked slots, etc. and then serve this task list to an associate (e.g., employee) of the store via a native stocking application executing on a mobile computing device (e.g., a tablet, a smartphone) carried by the associate. In this implementation, the system can implement methods and techniques described in U.S. patent application Ser. No. 15/347,689 to prioritize this list of tasks to correct improperly-stocked slots throughout the store.

In one example, the system: detects omission of a first product entirely from a first slot on a first shelf in the store in Block S152; retrieves a first number of units of the first product assigned to the first slot by the planogram; generates a notification specifying an identifier (e.g., a SKU) of the first product, the number of units of the first product assigned to the first slot, a location of the first slot on the first shelf, and a location of the first shelf within the store; and then transmits the notification to a mobile computing device assigned to an associate of the store substantially in Block S160. In this example, the system can transmit the notification to the associate in real-time, such as if the first product is a high-value product determined to be empty during a high-traffic period at the store. Alternatively, the system can delay transmission of the notification to the associate until the robotic system completes a scan of the store, a full stock state of the store is determined from these scan data, and a list of restocking prompts is ordered according to values of these under- or mis-stocked products.

In this implementation, the system can receive inputs from the associate through the native stocking application to close tasks, and the system can later confirm that these tasks were properly closed based on images collected by the robotic system during the next scan cycle within the store. However, the system can output stocking status data in any other format in Block S160.

14.3 Accommodating Out-of-Stock Products

In Block S160, the system can also selectively deactivate or discard restocking prompts based on current availability of units of product needed to respond to these restocking prompts. In particular, if the system determines that a particular slot is under-, improperly-, or mis-stocked, the system can interface with a back-of-store inventory manager to determine whether additional units of a product assigned to the particular slot are currently available; if so, the system can serve a restocking prompt for the slot to an associate of the store; otherwise, the system can discard the restocking prompt.

Furthermore, if additional units of a first product assigned to a slot in the store by a planogram are not currently available, associates or managers of the store may move a second product that is available into this slot. Though deviating from the planogram, the slot may thus be filled by a second product, which may be (visually and monetarily) more desirable than the slot remaining empty. Therefore, the system can accommodate this manual change in real-time by detecting a unit of the second product in the slot assigned the first product, checking that the first product is not in stock at the store, and temporarily updating the planogram to assign the second product to the slot until the additional units of the first product are made available at the store. In this example, the system can also implement methods and techniques described above to detect a shelf tag adjacent the slot, confirm that the shelf tag corresponds to the second product, and accommodate temporary reassignment of the slot to the second product pending a match between the second product and the adjacent shelf tag.

For example, in response to identifying an object represented in a region of an image as a unit of the second product rather than a unit of a first product assigned to a slot containing the object, the system can access available inventory of units of the first product at the store. If lack of availability of units of the first product at the store is thus confirmed, the system can: withhold the prompt to replace the unit of the second product—currently occupying the first slot—with a unit of the first product; and temporarily write the second product to the first slot, in replacement of the first product, in the planogram.

14.4 Prompting Transfer of Product to an Assigned Slot

In the implementation described above in which the system detects a unit of second product in a first slot assigned a first product by the planogram, the system can: scan the planogram for a second slot nearest the first slot and assigned the second product; and then generate a second prompt to move the unit of the second product from the first slot to the second slot. Thus, in this implementation, the system can fuse planogram deviations detected across multiple slots throughout the store into a revised (e.g., refined) set of prompts or tasks that enable associates of the store to restock slots and to redistribute on-floor product to their correct slots with improved efficiency. For example, the system can: serve—to an associate of the store—a first prompt to replace the unit of the second product currently stored in the first slot with a unit of the first product; and pair the first prompt with a second prompt to return the second product to a nearest slot assigned the second product and currently under-stocked.

The system can repeat the foregoing methods and techniques during each scan cycle executed by the robotic system. For example, the system can repeat the foregoing methods and techniques after scan cycles performed by the robotic system every night after the store closes in order to generate a stocking status map and a stocking correction task list before the store opens the following morning.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of an user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking placement of products on shelves in a store comprising:
   accessing a first image comprising visual data recorded by a mobile robotic system at a first time, the first image associated with a first location and a first orientation of the mobile robotic system within the store at the first time;
   detecting a first shelf represented proximal a first region of the first image;
   determining an address of the first shelf based on the first location, the first orientation, and a vertical position of the first shelf within the first image;
   based on the address of the first shelf, retrieving a first list of products assigned to the first shelf by a planogram of the store;
   retrieving a first set of template images from a database of template images, each template image in the first set of template images comprising visual features of a product specified in the first list of products;
   extracting a first set of features from the first region of the first image;
   confirming presence of a unit of a first product, in the first list of products, on the first shelf in response to correlation between features in the first set of features and features in a first template image, in the first set of template images, representing the first product;
   determining that a unit of the first product is improperly stocked on the first shelf in response to deviation between features in the first set of features and features in the first template image; and
   in response to determining that the unit of the first product is improperly stocked on the first shelf, generating a first restocking prompt for the first product on the first shelf.

2. The method of claim 1:
   wherein extracting the first set of features from the first region of the first image comprises:
      from the first region of the first image, detecting a set of discrete objects arranged across the first shelf;
      identifying a first subregion in the first region of the first image corresponding to a first discrete object, in the set of discrete objects, located at a first position on the first shelf; and
      extracting the first set of features from the first subregion in the first region of the first image; and
   wherein confirming presence of the unit of the first product on the first shelf comprises identifying the first discrete object as the unit of the first product in response to correlation between features in the first set of features and features in the first template image representing the first product.

3. The method of claim 2:
   further comprising:
      identifying a second subregion in the first region of the first image corresponding to a second discrete object, in the set of discrete objects, located at a second position on the first shelf;

extracting a second set of features from the second subregion in the first region of the first image;

identifying the second discrete object as a unit of a second product, in the first list of products, in response to correlation between features in the second set of features and features in a second template image, in the first set of template images, representing the second product; and in response to identifying the first discrete object as the unit of the first product and identifying the second discrete object as the unit of the second product, detecting improper arrangement of the unit of the first product and the unit of the second product in response to a lateral offset between the first position and the second position deviating from a target lateral offset assigned to the first product and the second product on the first shelf by the planogram; and wherein generating the first restocking prompt for the first product on the first shelf comprises generating the first restocking prompt specifying correction of relative positions of the unit of the first product and the unit of the second product in response to detecting improper arrangement of the first product and the second product on the first shelf.

4. The method of claim 1:

wherein confirming presence of the unit of a first product on the first shelf comprises confirming presence of a set of discrete units of the first product on the first shelf in response to discrete clusters of features in the first set of features exhibiting strong correlation to features in the first template image representing the first product;

further comprising:

generating a count of units of the first product in the set of discrete units of the first product on the first shelf;

confirming proper stocking of the first product on the first shelf in response to the count equaling a quantity of facings of the first product assigned to the first shelf by the planogram; and detecting improper stocking of the first product on the first shelf in response to the count deviating from the quantity of facings of the first product assigned to the first shelf by the planogram; and wherein generating the first restocking prompt for the first product on the first shelf comprises generating the first restocking prompt specifying correction of facings of the first product on the first shelf in response to detecting improper stocking of the first product on the first shelf.

5. The method of claim 1, further comprising:

detecting a second shelf represented in a second region of the first image below the first region;

determining an address of the second shelf based on the first location, the first orientation, and a vertical position of the second shelf within the first image;

based on the address of the second shelf, retrieving a second list of products assigned to the second shelf by the planogram;

retrieving a second set of template images from the database of template images, each template image in the second set of template images comprising visual features of a product specified in the second list of products;

extracting a second set of features from the second region of the first image;

confirming presence of a unit of a second product, in the second list of products, on the second shelf in response to a first degree of correlation between features in the second set of features and features in a second template image, in the second set of template images, representing the second product;

determining that a unit of the second product is improperly stocked on the second shelf in response to a second degree of correlation, less than the first degree, between features in the second set of features and features in the second template image;

in response to determining that the unit of the second product is improperly stocked on the first shelf, generating a second restocking prompt for the second product on the second shelf; and compiling the first restocking prompt and the second restocking prompt into a global electronic restocking list.

6. The method of claim 1:

wherein confirming presence of the unit of the first product on the first shelf comprises:

matching features, in the first set of features extracted from the first region of the first image, to a first group of features defined in the first template image of the first product;

confirming absence of a second group of features, defined in the first template image, from the first set of features extracted from the first region of the first image; and detecting orientation of the unit of the first product on the shelf in other than a target orientation in response to the first set of features comprising features matching the first group of features and omitting the second group of features in the first template image representing the first product; and wherein generating the first restocking prompt for the first product on the first shelf comprises generating the first restocking prompt to correct orientation of the unit of the first product on the first shelf in response to detecting orientation of the unit of the first product on the shelf in other than the target orientation.

7. The method of claim 1:

further comprising:

identifying a first shelf tag proximal a bottom edge of the first region of the first image;

in response to confirming presence of the unit of the first product on the first shelf, extracting a horizontal distance from a left vertical edge of the first shelf tag to a left vertical edge of the unit of the first product; and in response to the horizontal distance exceeding a threshold distance, determining that the unit of the first product is misoriented on the first shelf; and wherein generating the first restocking prompt for the first product on the first shelf comprises generating the first restocking prompt to correct an orientation of the unit of the first product on the first shelf in response to determining that the unit of the first product is misoriented on the first shelf.

8. The method of claim 1:

wherein extracting the first set of features from the first region of the first image comprises:

identifying a first subregion of the first region of the first image corresponding to a first slot on the first shelf assigned the first product by the planogram; and extracting a first subset of features from the first subregion of the first image;

wherein determining that the unit of the first product is improperly stocked on the first shelf comprises:
    detecting omission of the unit of the first product from the first slot on the first shelf in response to the first subset of features exhibiting less than a threshold correlation to features in the first template image; and
    identifying the first slot on the first shelf as empty in response to correlation between features in the first subset of features and a second set of features representing empty shelves; and
wherein generating the first restocking prompt for the first product on the first shelf comprises generating the first restocking prompt for filling the first slot on the first shelf with units of the first product in response to identifying the first slot on the first shelf as empty.

9. The method of claim 1:
wherein determining the address of the first shelf comprises identifying the first shelf, a first shelving segment containing the first shelf and a second shelf, a first shelving structure containing the first shelving segment and a second shelving segment, and a first aisle facing the first shelving structure and a second shelving structure;
wherein extracting the first set of features from the first region of the first image comprises:
    identifying a first subregion in the first region of the first image corresponding to a first slot on the first shelf assigned the first product by the planogram; and
    extracting the first set of features from the first subregion of the first image;
wherein determining that the unit of the first product is improperly stocked on the first shelf comprises:
    detecting presence of an object in the first slot based on the first set of features; and
    identifying the object as other than a product in the first list of products in response to less than a threshold similarity between the first set of features and features in template images in the first set of template images;
further comprising, in response to detecting presence of the object in the first slot and identifying the object as other than a product in the first list of products:
    retrieving a second list of products assigned to the first shelving segment by the planogram, the second list of products excluding the first list of products;
    retrieving a second set of template images from the database of template images, each template image in the second set of template images comprising visual features of a product specified in the second list of products; and
    identifying the object as a unit of a second product, in the second list of products, in response to correlation between features in the first set of features and features in a second template image, in the second set of template images, representing the second product; and
wherein generating the first restocking prompt comprises, in response to identifying the object as the unit of the second product, generating a prompt to replace the unit of the second product currently occupying the first slot with a unit of the first product.

10. The method of claim 9, further comprising, in response to identifying the object as the unit of the second product:
scanning the planogram for a second slot nearest the first slot and assigned the second product; and
generating a second prompt to move the unit of the second product to the second slot.

11. The method of claim 9, further comprising, in response to identifying the object as the unit of the second product:
accessing available inventory of units of the first product at the store;
in response to lack of availability of units of the first product at the store:
    withholding the prompt to replace the unit of the second product currently occupying the first slot with a unit of the first product; and
    temporarily writing the second product to the first slot, in replacement of the first product, in the planogram.

12. The method of claim 9:
further comprising:
    identifying the object as other than a product in the second list of products in response to less than a threshold similarity between the first set of features and features in template images in the second set of template images;
    in response to identifying the object as other than a product in the second list of products:
        retrieving a third list of products assigned to the first shelving structure by the planogram, the third list of products excluding the first list of products and the second list of products;
        retrieving a third set of template images from the database of template images, each template image in the third set of template images comprising visual features of a product specified in the third list of products; and
        identifying the object as a unit of a third product, in the third list of products, in response to correlation between features in the first subset of features and features in a third template image, in the third set of template images, representing the third product; and
wherein generating the first restocking prompt comprises, in response to identifying the object as the unit of the third product, generating a prompt to replace the unit of the third product currently occupying the first slot with a unit of the first product.

13. The method of claim 12:
further comprising:
    identifying the object as other than a product in the third list of products in response to less than a threshold similarity between the first set of features and features in template images in the third set of template images;
    in response to identifying the object as other than a product in the third list of products:
        retrieving a fourth list of products assigned to the first aisle by the planogram, the fourth list of products excluding the first list of products, the second list of products, and the third list of products;
        retrieving a fourth set of template images from the database of template images, each template image in the fourth set of template images comprising visual features of a product specified in the fourth list of products; and
        identifying the object as a unit of a fourth product, in the fourth list of products, in response to correlation between features in the first set of features and features in a fourth template image, in the fourth set of template images, representing the fourth product; and wherein generating the first restocking prompt comprises, in response to identifying the object as the unit of the fourth product, generating a prompt to replace the unit of the fourth product currently occupying the first slot with a unit of the first product.

14. The method of claim 1:

wherein retrieving the first set of template images from the database of template images comprises retrieving the first template image of the first product in a current packaging and a second template image of the first product in a previous packaging differing from the current packaging;

wherein confirming presence of the unit of the first product on the first shelf comprises:
confirming presence of the unit of the first product, in the current packaging, on the first shelf in response to correlation between features in the first set of features and features in the first template image; and
confirming presence of the unit of the first product, in the previous packaging, on the first shelf in response to correlation between features in the first set of features and features in the second template image;

wherein generating the first restocking prompt for the first product on the first shelf comprises, in response to confirming presence of the unit of the first product in the previous packaging on the first shelf, generating the first restocking prompt to replace the unit of the first product in the previous packaging with a unit of the first product in the current packaging.

15. The method of claim 14, further comprising:

predicting presence of the unit of the first product, in a new packaging, on the first shelf in response to correlation between features in the first set of features and features in the first template image and the second template image and in response to the first set of features comprising features unique to the first template image and the second template image;

storing a subregion of the first region of the first image corresponding to the unit of the first product in the new packaging as a new template image of the first product in the new packaging;

writing the new template image to the database of template images; and generating a prompt to supply a stock image of the first product in the new packaging.

16. The method of claim 1:

wherein retrieving the first set of template images from the database of template images comprises retrieving a set of multi-dimensional vectors, each multi-dimensional vector in the set of multi-dimensional vectors defining features representative of a product in the first list of products;

wherein extracting the first set of features from the first region of the first image comprises:
identifying a first subregion in the first region of the first image bounding a first discrete object; and
implementing computer vision techniques to detect and extract the first set of features comprising geometry, color, and text features from the first subregion in the first region of the first image; and wherein confirming presence of the unit of the first product on the first shelf comprises:
calculating a composite score for correlations between features in the first set of features and features defined by a first multi-dimensional vector, in the set of multi-dimensional vectors, representing the first product; and
identifying the first object as the unit of the first product in response to the composite score exceeding a threshold score.

17. The method of claim 1, wherein detecting the first shelf represented proximal the first region of the first image comprises:

detecting a first linear feature extending laterally across the first image;

correlating the first linear feature with the first shelf in a first shelving segment;

detecting a second linear feature extending laterally across the first image above the first linear feature;

correlating the second linear feature with a second shelf above the first shelf in the first shelving segment;

bounding the first region of the first image extending from proximal the first linear feature to proximal the second linear feature in the first image, the first region corresponding to an accessible volume of the first shelf.

18. The method of claim 1:

wherein determining that the unit of the first product is improperly stocked on the first shelf comprises detecting omission of the unit of the first product from a first slot on the first shelf assigned a first number of units of the first product by the planogram;

wherein generating the first restocking prompt for the first product on the first shelf comprises generating a notification specifying an identifier of the first product, the first number of units of the first product, a location of the first slot on the first shelf, and a location of the first shelf within the store defined by the planogram; and transmitting the notification to a mobile computing device assigned to an associate of the store.

19. The method of claim 1, wherein accessing the first image comprises:

receiving a set of digital photographic images recorded, at approximately the first time, by a set of discrete color cameras integrated into the mobile robotic system, the mobile robotic system occupying the first location and arranged in the first orientation within the store at the first time, the first location adjacent a first shelving segment containing the first shelf;

assembling the set of digital photographic images into the first image based on known positions of the set of discrete color cameras within the mobile robotic system; and storing the first location, the first orientation, and the first time in metadata of the first image.

20. The method of claim 1, further comprising:

accessing a second image comprising visual data recorded by the mobile robotic system at a second time succeeding the first time, the second image associated with a second location and a second orientation of the mobile robotic system within the store at the second time, the second location offset from the first location;

detecting a second shelf represented proximal a second region of the second image;

determining an address of the second shelf based on the second location, the second orientation, and a vertical position of the second shelf within the second image;

based on the address of the second shelf, retrieving a second list of products assigned to the second shelf by the planogram;

retrieving a second set of template images from the database of template images, each template image in the second set of template images comprising visual features of a product specified in the second list of products;

extracting a second set of features from the second region of the second image;

confirming presence of a unit of a second product, in the second list of products, on the second shelf in response to a first degree of correlation between features in the second set of features and features in a second template image, in the second set of template images, representing the second product;

determining that a unit of the second product is improperly stocked on the second shelf in response to a second degree of correlation, less than the first degree of correlation, between features in the second set of features and features in the second template image;

in response to determining that the unit of the second product is improperly stocked on the second shelf, generating a second restocking prompt for the second product on the second shelf; and assembling the first restocking prompt and the second restocking prompt into a global restocking list for the store.

\* \* \* \* \*